United States Patent [19]

Auinger

[11] 4,127,787
[45] Nov. 28, 1978

[54] CHANGEABLE POLE THREE PHASE WINDING

[75] Inventor: Herbert Auinger, Nuremberg, Germany

[73] Assignee: Siemens Aktiengesellschaft, Berlin and Munich, Germany

[21] Appl. No.: 658,455

[22] Filed: Feb. 17, 1976

[30] Foreign Application Priority Data

Feb. 17, 1975 [DE] Fed. Rep. of Germany ....... 2506573

[51] Int. Cl.² .............................................. H02K 3/00
[52] U.S. Cl. .................................. 310/184; 310/198; 318/773; 318/704
[58] Field of Search ........ 310/179, 180, 184, 198–208; 318/224 R, 224 A; 322/90

[56] References Cited

U.S. PATENT DOCUMENTS

| | | |
|---|---|---|
| 2,898,534 | 8/1959 | Rawcliffe .................... 318/224 R |
| 3,161,814 | 12/1964 | Williams ..................... 318/224 R |
| 3,197,686 | 6/1965 | Rawcliffe .................... 318/224 R |
| 3,233,159 | 2/1966 | Rawcliffe .................... 318/224 R |
| 3,927,358 | 12/1975 | Broadway .................... 318/224 R |
| 3,949,253 | 4/1976 | Broadway ....................... 310/184 |
| 4,013,909 | 3/1977 | Broadway ....................... 310/202 |

FOREIGN PATENT DOCUMENTS

| | | | |
|---|---|---|---|
| 2,191,323 | 1/1974 | France ..................................... 310/198 |
| 2,260,214 | 1/1974 | France ..................................... 310/198 |

*Primary Examiner*—R. Skudy
*Attorney, Agent, or Firm*—Kenyon & Kenyon, Reilly, Carr & Chapin

[57] ABSTRACT

In order to obtain any number of poles in the ratio $p_1 : p_2 = 3m : 2n$ in a pole changeable three phase winding having nine base winding branches and only six connecting points with a simple, symmetrical, low harmonic content winding, three equiphasal induced coil sides belonging to the same phase of the winding are arranged such that for a pole pair number $p_2$ they are located in three respective slots appearing as vectors with the same direction in the $p_2$ pole pair slot-vector star or, in the case of at least two coils being arranged in each slot layer, two of every three such equiphasal induced coils belonging to the same phase for a pole number $p_2$ are accommodated in a common slot with the third in a second slot appearing as a vector with the same direction in the $p_2$-pole pair slot-vector star.

22 Claims, 90 Drawing Figures

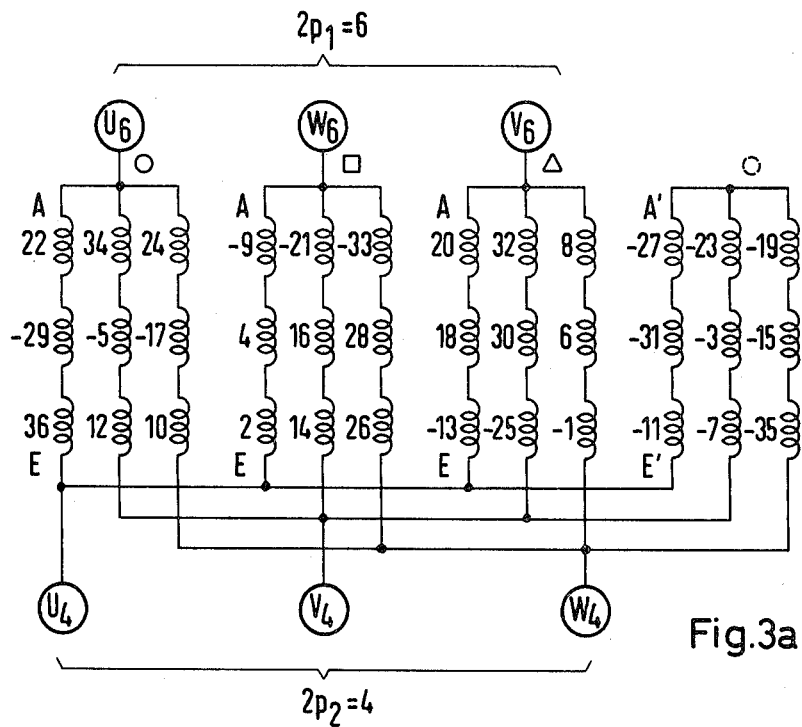
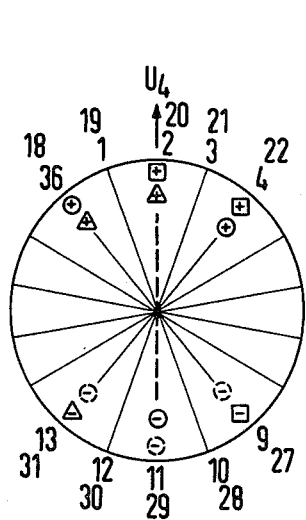
Fig.3c
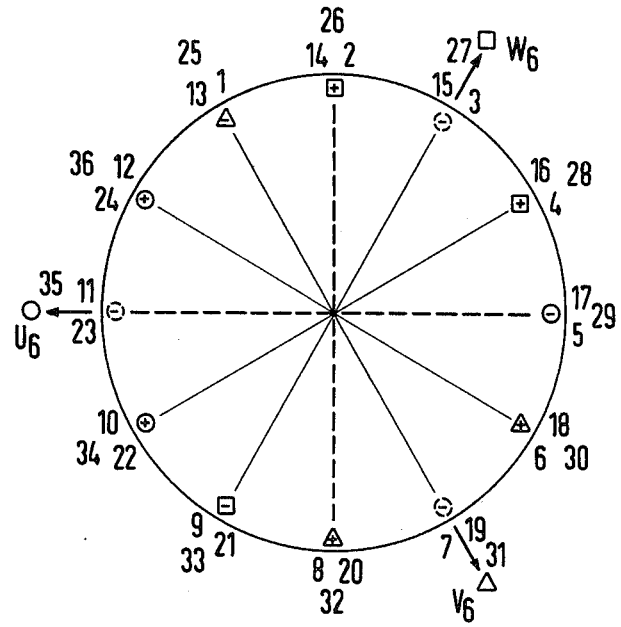
Fig.3d

Correlation for $2p_1 = 6$ $2p_2=4$
$\xi_4=0{,}831$
$\sigma_4=1{,}41\%$ $2p_1=6$
$\xi_6=0{,}911$
$\sigma_6=2{,}84\%$ $2p_2=4$
$\xi_4=0{,}735$
$\sigma_4=1{,}43\%$ $2p_1=6$
$\xi_6=0{,}88$
$\sigma_6=4{,}54\%$ Span 1-7

Span 1-6

Span 1-7

Span 1-6

4-pole
$\xi_4 = 0.819$
$\sigma_4 = 1.15\%$ 6-pole
$\xi_6 = 0.911$
$\sigma_6 = 2.84\%$

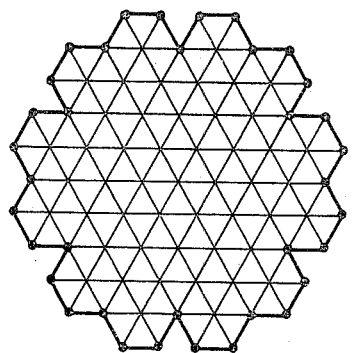
Fig.8g
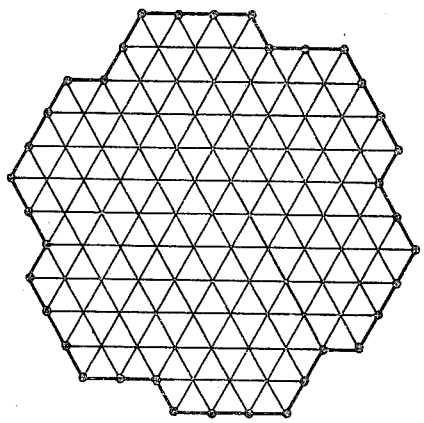
Fig.8h
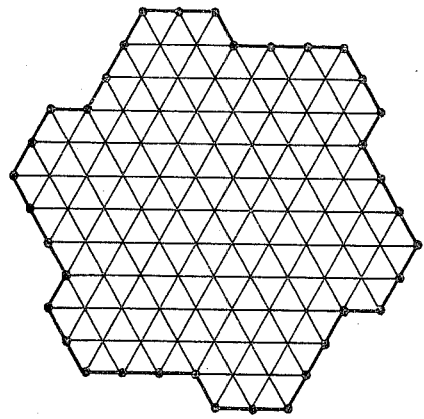
Fig.8i
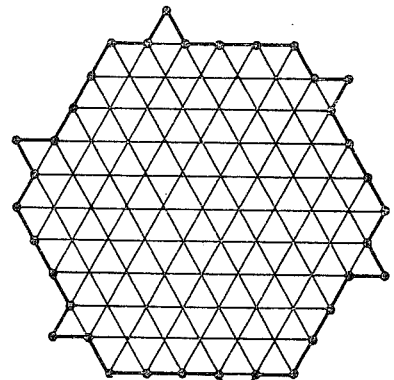
Fig.8k
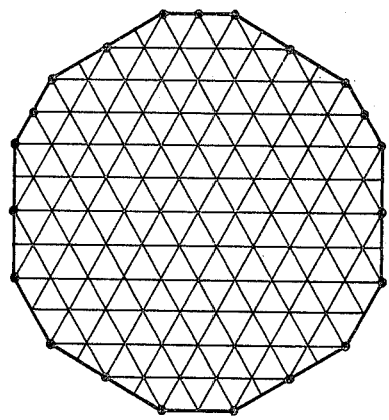
Fig.8α
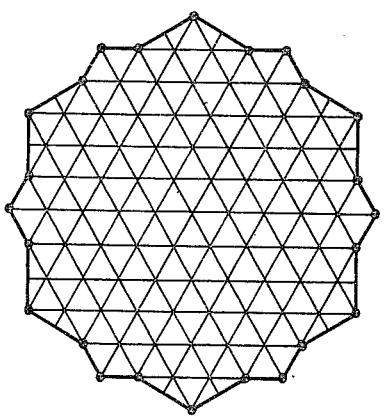
Fig.8β

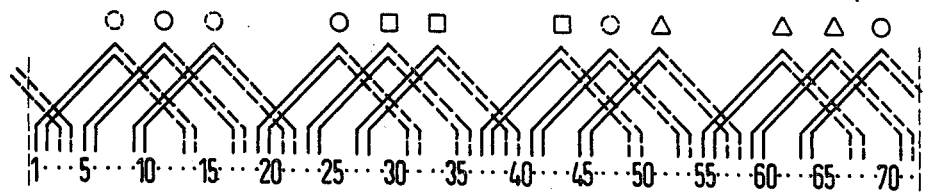
Fig.9a
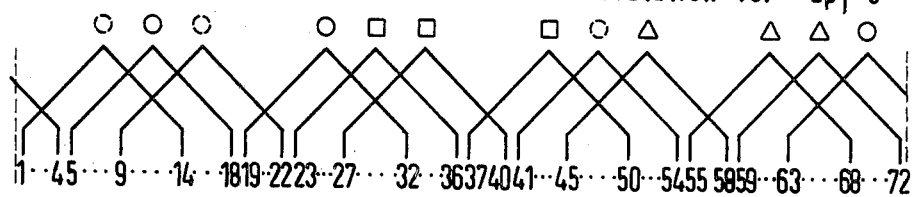
Fig.9b
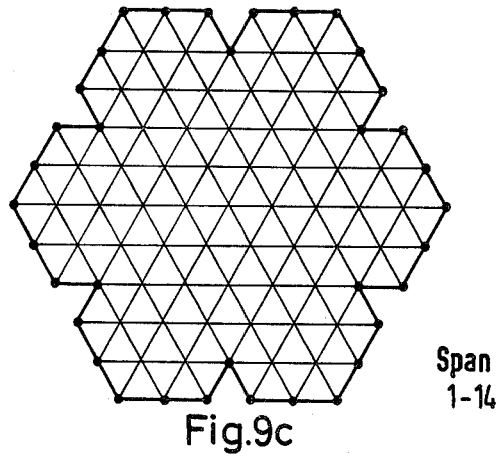
Fig.9c  Span 1-14
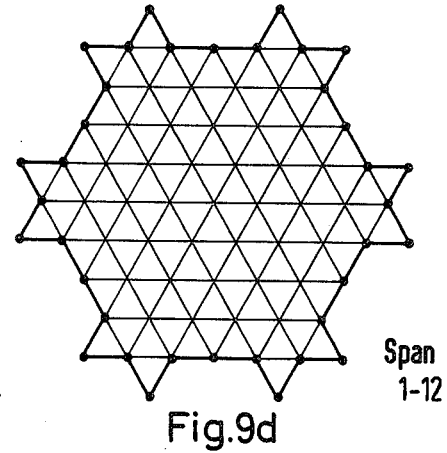
Fig.9d  Span 1-12

Span 1-14

Span 1-12

Span 1-14

Span 1-12

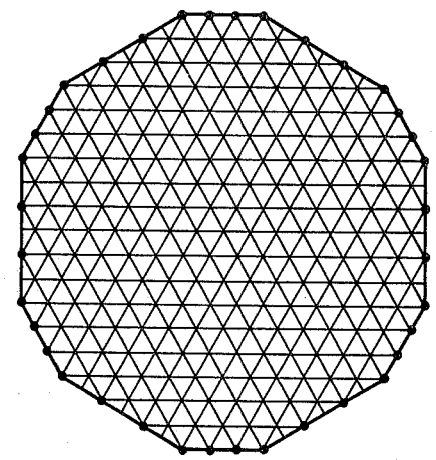
Fig.10α
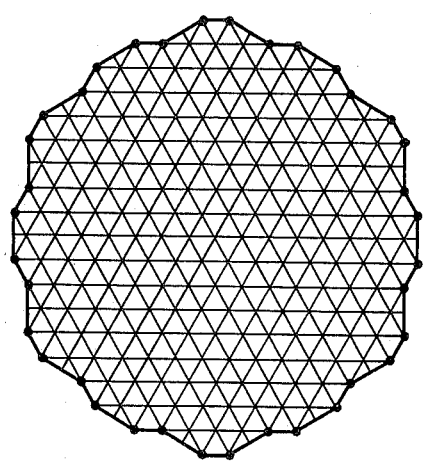
Fig.10β
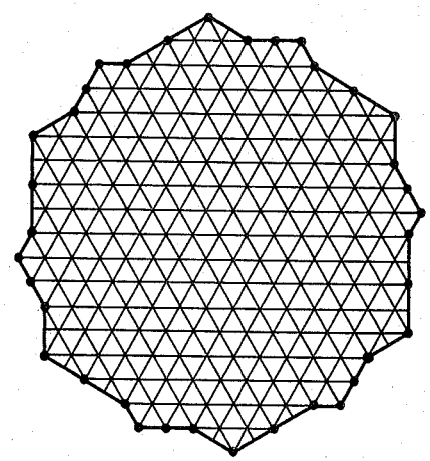
Fig.10γ
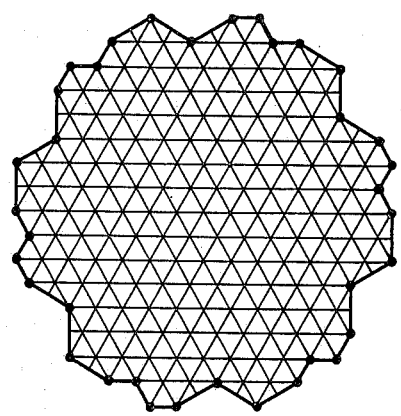
Fig.10δ
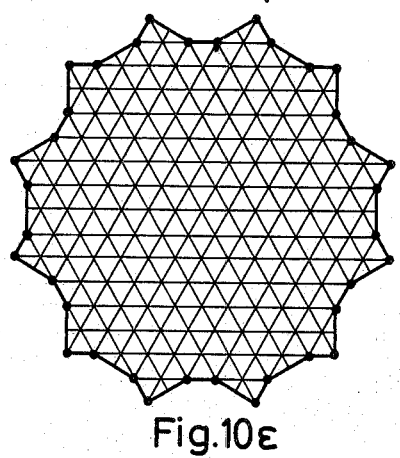
Fig.10ε
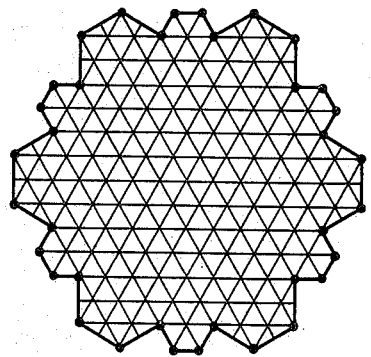
Fig.10η

8-pole
$\xi_8 = 0{,}831$
$\sigma_8 = 5{,}78\%$ 6-pole
$\xi_6 = 0{,}88$
$\sigma_6 = 2{,}77\%$ Correlation for $2p_1=6$ 4-pole 6-pole

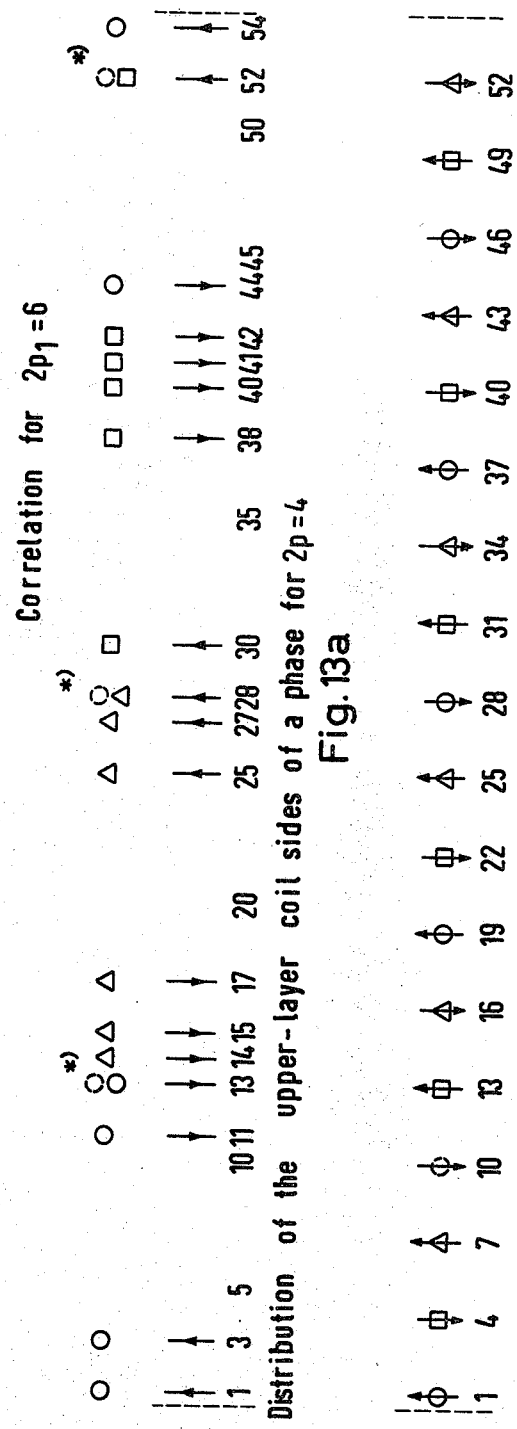
Fig. 13a — Distribution of the upper-layer coil sides of a phase for $2p=4$
Fig. 13b — Position of the 6-pole phase distribution

| 6-pole distribution | Parallel branches for $2p_2 = 4$ | | Phase |
|---|---|---|---|
| | Distribution in 4-pole operation | | |
| ←—100°—→<br>○○○□△ ←<br>○○○□△△△<br>○○□□△△△△<br>⊢20°⊣ | ○△<br>○□ | ○ □ △ △ ○ △<br>○ △△△ ○ □<br>□ ○ □ □ △<br>⊢ 40° ⊣ ⊢$\frac{40°}{3}$⊣ ⊢$\frac{20°}{3}$⊣ | a) ○△□ |
| ←—120°—→<br>○○□△ ←<br>○○○□△△△<br>○○○□□△△△<br>○○□□△△△△<br>⊢20° | ○□△<br>○□ | ○ □ △ ○ △<br>○△△△ ○ □<br>□ ○ □ □ △<br>○ □ △△△△<br>⊢ 40° ⊣ ⊢$\frac{40°}{3}$⊣ ⊢$\frac{20°}{3}$⊣ | b) ○△□ |

\*) as selected
a) with $\cdot = 20°$
$\quad f = 100°$
Associated with null winding ○

\*) or
b) with $\gamma = 0°$
$\quad f = 120°$
Associated with the base winding branches □, △, ○

Fig. 13c

Table I general pole pair number ratio $p_1 : p_2 = 3m : 2n$
(m, n integers)
($p_1 : p_2$ is a fractional number with aliquant numerator and denominator)

| $2p_1$ | m | $2p_2$ | n | $p_1 : p_2$ | realizable for $p_2 = 2n$ as |
|---|---|---|---|---|---|
| 6 | 1 | 4 | 1 | 3 : 2 | Integer-slot winding |
|   |   | 8 | 2 | 3 : 4 | Half-slot winding |
|   |   | 16 | 4 | 3 : 8 | Quarter-slot winding |
|   |   | 20 | 5 | 3 : 10 | Fifth-slot winding |
|   |   | 28 | 7 | 3 : 14 | Seventh-slot winding |
|   |   | 32 | 8 | 3 : 16 | Eighth-slot winding |
| 12 | 2 | 8 | 2 | 3 : 2 | Integer-slot winding |
|   |   | 16 | 4 | 3 : 4 | Half-slot winding |
|   |   | 32 | 8 | 3 : 8 | Quarter-slot winding |
| 18 | 3 | 4 | 1 | 9 : 2 | Integer-slot winding |
|   |   | 8 | 2 | 9 : 4 | Half-slot winding |
|   |   | 12 | 3 | 3 : 2 | Integer-slot winding |
|   |   | 16 | 4 | 9 : 8 | Quarter-slot winding |
|   |   | 20 | 5 | 9 : 10 | Fifth-slot winding |
|   |   | 24 | 6 | 3 : 4 | Half-slot winding |
|   |   | 28 | 7 | 9 : 14 | Seventh-slot winding |
|   |   | 32 | 8 | 9 : 16 | Eighth-slot winding |

Fig. 14

Table II

| Coil span | Connection 4/6-pole | Winding-factor | *) Harmonic Leakage factor % | $B_4 : B_6$ | Even Harmonics |
|---|---|---|---|---|---|
| 1 – 7 (Fig. 3) | Quadr'le star | $\xi_4 = 0,731$ | $\sigma_0 = 2,62$ | 0,831 | no |
|  | Triple star | $\xi_6 = 0,911$ | $\sigma_0 = 2,84$ |  |  |
| 1 – 6 | Quadr'le star | $\xi_4 = 0,647$ | $\sigma_0 = 2,01$ | 0,91 | no |
|  | Triple star | $\xi_6 = 0,88$ | $\sigma_0 = 6,29$ |  | yes |
| 1 – 7 (Fig. 4) | Quadr'le star | $\xi_4 = 0,831$ | $\sigma_0 = 1,41$ | 0,731 | no |
|  | Triple star | $\xi_6 = 0,911$ | $\sigma_0 = 2,84$ |  |  |
| 1 – 6 | Quadr'le star | $\xi_4 = 0,735$ | $\sigma_0 = 1,43$ | 0,80 | no |
|  | Triple star | $\xi_6 = 0,88$ | $\sigma_0 = 4,54$ |  | yes |

*) Conventional three-phase two-layer 60°-spread windung (not pole-changeable) for comparison:

4-pole:
$\begin{cases} 1/1 \text{ chord} & \sigma_0 = 1,41 \% \\ 7/9 \text{ chord} & \sigma_0 = 1,11 \% \\ 8/9 \text{ chord} & \sigma_0 = 1,15 \% \\ 2/3 \text{ chord} & \sigma_0 = 1,41 \% \end{cases}$ 6-pole:
$\begin{cases} 1/1 \text{ chord} & \sigma_0 = 2,84 \% \\ 5/9 \text{ chord} & \sigma_0 = 2,36 \% \\ 2/3 \text{ chord} & \sigma_0 = 2,84 \% \end{cases}$

Fig. 15

Table III

| Span 1 - 7 Embodiment | | Winding factor *) | m.m.f. Harmonic Leakage factor % | corr. chord | $B_4/B_6$ |
|---|---|---|---|---|---|
| Overlapped 1 slot | | $\xi_4 = 0,819$<br>$\xi_6 = 0,911$ | $\sigma_4 = 1,15$<br>$\sigma_6 = 2,84$ | 8/9<br>- | 0,742 |
| Overlapped 2 slot | | $\xi_4 = 0,781$<br>$\xi_6 = 0,911$ | $\sigma_4 = 1,11$<br>$\sigma_6 = 2,84$ | 7/9<br>- | 0,778 |
| 4-layer winding or 2-layer winding with double coils | Staggered 1 slot | $\xi_4 = 0,819$<br>$\xi_6 = 0.88$ | $\sigma_4 = 1,15$<br>$\sigma_6 = 2,35$ | 8/9<br>5/6 | 0,716 |
| | Staggered 2 slots | $\xi_4 = 0,781$<br>$\xi_6 = 0,88$ | $\sigma_4 = 1,11$<br>$\sigma_6 = 2,35$ | 7/9<br>5/6 | 0,751 |
| | Staggered 3 slots | $\xi_4 = 0,72$<br>$\xi_6 = 0,88$ | $\sigma_4 = 1,41$<br>$\sigma_6 = 2,35$ | 2/3<br>5/6 | 0,815 |
| | Staggered 4 slots | $\xi_4 = 0,637$<br>$\xi_6 = 0,88$ | $\sigma_4 = 1,43$<br>$\sigma_6 = 2,35$ | -<br>5/6 | 0,921 |

*) For comparison: <u>conventional 60°-spread 2-layer winding</u>

4 pole:
- 1/1 chord    $\xi_4 = 0,960$
- 8/9 chord    $\xi_4 = 0,945$
- 7/9 chord    $\xi_4 = 0,902$
- 6/9 chord    $\xi_4 = 0,831$ 6 pole:
- 1/1 chord    $\xi_6 = 0,966$
- 5/6 chord    $\xi_6 = 0,933$

Fig. 16

Table IV

| Distribution for one layer with $2p_2 = 4n$ | | Distribution factor | coil span 1- 13 *) | | | |
|---|---|---|---|---|---|---|
| | | $\xi_2$ | $\xi_4$ | $\sigma_{o_4}\%$ | $B_4/B_6$ | $B_4/B_6$ |
| symmetrical | a) | 0,956 | 0,828 | 0,516 | 0,727 | 0,677 |
| | b) | 0,927 | 0,803 | 0,417 | 0,750 | 0,699 |
| | c) | 0,870 | 0,753 | 0,643 | 0,799 | 0,744 |
| | d) | 0,841 | 0,728 | 1,256 | 0,827 | 0,771 |
| | e) | 0,815 | 0,706 | 0,826 | 0,853 | 0,795 |
| | f) | 0,786 | 0,681 | 1,024 | 0,884 | 0,824 |
| | g) | 0,736 | 0,637 | 1,249 | 0,945 | 0,881 |
| asymmetr. | h) | 0,898 | 0,778 | 0,622 | 0,774 | 0,763 |
| | i) | 0,871 | 0,755 | 0,980 | 0,797 | 0,786 |
| | k) | 0,818 | 0,708 | 0,968 | 0,850 | 0,838 |

| Distribution for both layers with $2p_1 = 6$ (always equal for all variants a to k) | $\xi_6$ | $\sigma_{o_6}\%$ |
|---|---|---|
| | 0,903 | 0,89 |
| | 0,841 | 1,125 |

Variants a) and d) realizable with double concentric coils, span 1 to 14, 2 to 13

*) for other coil spans, even harmonics appear for $2p_1 = 6$ for instance, with span 1 to 12:

$\xi_4$ changes   0.946 times
    $\xi_6$             0.99
    $B_4/B_6$     1.05 for instance, with span 1 to 14:

$\xi_4$ changes   1.047 times
    $\xi_6$             0.99
    $B_4/B_6$     0.95

Fig. 17

Table V

Elementary distribution with elementary phase/$(30/k)° = 10°$ el spread bands for $2p_1 = 3m$

| Variant | Different possible variations | Distribution factor $\xi_Z = 0,9107$ | Total winding factor $\xi = \xi_Z \cdot \xi_V$ | |
|---|---|---|---|---|
| | | | $\xi_V$ | $\xi$ |
| α | 10° 10° *) | | 0,9899 | 0,9015 |
| β | ⊢20°⊣20°⊣ *) | | 0,9598 | 0,8741 |
| γ | ⊢40°⊣10°⊢ *) | | 0,9302 | 0,8471 |
| δ | ⊢50°⊣20°⊢ *) | | 0,8724 | 0,7944 |
| ε | ⊢40°⊣40°⊢ *) | | 0,8440 | 0,7686 |
| η | ⊢50°⊣50°⊢ *) | | 0,7619 | 0,6938 |

*) with $\xi_V$ as displacement factor due to displacement angles between the elementary distributions

Fig.18

Table VI ① 18/4n-pole-changeable windings for N = 108 slots; the upper-layer coil sides for the pole number divisible by 2n with phase correlation for $2p_1 = 18$ is shown

Table VII

| | Possible variations | Advantages | Disadvantages |
|---|---|---|---|
| 1. | Interspersing for $p_1 = 3m$ as well as also for $p_2 = 2n$ | relatively wide range for flux density relation | |
| 2. | Varied coil-span | Range expansion for $B_4 : B_6$ | higher m.h.f. harmonic content with even harmonics for $2p_1 = 6m$ |
| 3. | Single-layer windings | cost savings | higher harmonic content for both pole numbers and even harmonics with $2p_1 = 6m$ |
| 4. | Omitted null branches | 25 % savings of winding copper | empty slots layers, higher m.m.f. harmonic content for even pole pair number $p_2$ |
| | | Slot shapes adapted to different degrees of slot filling make possible larger passage cross sections for the magnetic field | expensive laminations |

Table VII continued

| | Possible variations | Advantages | Disadvantages |
|---|---|---|---|
| 5. | "Series connection" of the winding branches | increased number of turns for the pole number $p_1 = 3$ m | individual cils with three times the cross section and three times smaller number of turns |
| 6. | phase band overlapped windings or 4-layer windings | harmonic content as with optimum-cord two-layer windings. Better utilization than with separate windings | higher manufacturing cost |
| 7. | 180°-spread for $2p_1 = 6m$ | Fractional-slot windings with $q = z/2n$ for $2p_2 = 4n$ are possible | $\xi_6 \approx 0.65$ (relatively low) Higher manufacturing costs as twice the number of coils |
| 8. | Unbalanced winding branches | applicable also for fractional-slot windings; smaller number of slots | Applicable only with variation 4. or 5. Equalizing currents, as triple-parallel basic-winding branches are not equiphasal |

Fig. 20b

CHANGEABLE POLE THREE PHASE WINDING

BACKGROUND OF THE INVENTION

This invention relates to changeable pole three phase winding electric machines in general and more particularly to such a machine in which any number of pole-pairs in the ratio $p_1 : p_2 = 3m : 2n$ can be obtained using a simple, symmetrical, low harmonic content winding where $p_1 : p_2$ is a fractional number with aliquant numerator and denominator.

Pole changeable Machines are known which include a base winding formed by nine base winding branches each having the same number of series connected winding poles with three connecting points for each of the two pole pair numbers. The three connecting points for the pole pair number $p_2 = 2n$ are connected with three respective ends of the base winding branches.

Three phase windings in which the poles can be changed find particular application for changing the speed in asynchronous squirrel cage motors in a step like manner. A motor winding of this type having only six connecting points is described in the journal "Revue Generale d'Electricite", in particular pages 323-329. There a 6/4 pole three phase winding is described, this winding respresenting a special case of what are known as "phase modulated" windings which usually have more than six connection points. The disclosed changeable pole 6/4 pole three phase winding has a first winding part having a triple Y-connection and separate neutral points. This winding part is effective, i.e. carries current, for both pole numbers. A second winding part is connected to the ends of the first winding part which are tied together and carries current only for the six pole operation. In this article no details are given regarding the 8/6 pole three phase windings which are mentioned. For the 6/4 pole winding, the well known rule that the phases of the 4 pole winding cannot be divided, in principle, into three parallel branches of identical design holds true. As a result, this known pole changeable three phase winding generates a rotating field containing strong harmonics with subharmonics [$\nu = \frac{1}{2}$, 5/2, 7/2, etc.] and even-numbered harmonics which have adverse effect on the operating characteristics of the three phase machine during 4 pole operation. These subharmonics and even field harmonics generate, particulary in asynchronous machines with a relatively small air gap, parasitic effects such as, noise, vibrations, harmonic torques or shaft voltages.

In view of this, the need for an improved pole changeable motor having a simple switching arrangement, which is capable of providing a mutually independent adaptation of the effective number of turns of both, basically arbitrary pole number combination within the mentioned pole number ratio, using simple and, as far as possible, identical coil windings for the entire winding and at least obtaining the maximum symmetry possible, and through such measures obtaining complete suppression of even and subharmonic field harmonics is evident.

SUMMARY OF THE INVENTION

The present invention provides such as winding arrangement. The solution of the present invention is through a distribution of "base-winding-coils" in slots which are arranged with equal pitch such that either:

1. three induced equiphasal coil sides belonging to the same phase for $p_2 = 2n$ are arranged in three of four respective slots appearing in the $p_2 = 2n$ pole pair slot-vector star as vectors with the same direction or
2. where at least two coil sides of three respective such equiphasal induced coil-sides belonging to the same phase for $p_2 = 2n$ are arranged in each slot layer, two of the windings are accommodated in a common slot and a third is arranged in a second slot appearing in the $p_2 = 2n$ pole pair slot star as a vector of the same direction, and in both cases, that these coil sides are placed belong to different respective phases for the other pole pair number $p_1 = 3m$.

The embodiment of the second solution noted above requires only half the number of slots. However, with the number of pole pairs divisible by 3, it needs a phase spread of 180 electrical degrees with correspondingly low winding factors.

In accordance with the present invention it advantageous that separate coils sides be arranged in the slot layers which are free of "base windings." These coils sids will belong to three further winding branches referred to as "null winding branches" conneced in such a way that for number of pole pairs $p_1 = 3m$ the voltage induced in these coils adds up to zero. With the number of pole pairs $P_1$ divisible by 3, the "null winding branches" therefore have no outward effect. For the other pole pair number $p_2 = 2n$ they form, in each phase a fourth winding branch which is equivalent to the other three base winding branches which are equiphasal induced.

Where the winding coils belong to the null winding branches are made the same as in the base winding branches, their beginnings can be connected with each other and their ends with the respective connection points for the pole pair number $p_2 = 2n$. Hereinafter this is referred to as a "parallel connection". It is also possible to connect the beginnings of the null winding branches directly with the respective ends of the basic-winding-branches, with the ends of the null winding branches forming the connecting points for the pole pair number $p_2 = 2n$. Hereinafter, this is referred to as a "series connection". With such an arrangement it is advisable to make the coils of the null winding branches with a reduced number of turns and with a correspondingly increased conductor cross section.

Where integral slot windings having a step width corresponding to the pole pitch divided by three is used, the rotating fields of both pole numbers are free of disturbing even harmonics and/or subharmonics. Using another step width even numbered field harmonics result only for $p_1 = 3m$. With the three phase winding of the present invention, the number of coil turns are larger than with PAM windings because of the multiple parallel branches. As a result, with realizable integral numbers of coil turns, a voltage adaptation in finer steps is possible and the windings find applications in machines of higher rating.

Particularly in machines with a large number of slots per pole and phase, great variety can be obtained with respect to the distribution or winding-factor, the induction ratio and the harmonic leakage factor through different distribution of the respective coils belonging to a phase. In other words, such can be accomplished through the use of a phase interspersed arrangement. Furthermore, the coil width of the windings can be changed. However, this leads to the appearance of even harmonics where the pole number is a number divisible by three.

Designing the winding with concentric coils makes possible different numbers of conductors in the outer and inner coils without a change in caphasality of the coil voltages. This is possible in winding distributions where at least two coil sides belonging to the same winding branch lie next to each other and can be combined in one coil group. In this manner, individual numbers of coil turns can be made, in the case of an average coil-span corresponding to the pole pitch of the pole pair number $p_1$ divisible by three, such that they alternate with different numbers of conductors per layer. For example, there may 4 and 5 conductors per slot. Depending on whether the effective number of turns of the higher or the lower pole pair number is to be increased, the inner or outer coils are given the larger number of turns. The difference between the number of turns of both coils may be greater than 1. By having a difference of 1 the usual "half-turns", e.g. the use of turns such as 4.5 turns in the example above are possible. Otherwise, using coils of the same span different numbers of conductors can be obtained only with a coil span which deviates from the pole pitch $p_1 = 3m$.

If, starting with a two layer winding, every second coil is omitted, i.e. the inner or outer coil of a doubly concentric coil group, and instead the remaining coils are made with twice the number of turns, a single layer winding results which, while having somewhat larger m.m.f.-harmonic content than a two layer winding, is of particularly simple design.

Any winding design having a null branch phase bands without windings, i.e. one having only a basic winding, requires that only $\frac{2}{3}$ of the available slot cross sections be wound if the slotting is uniform. In order to avoid a disadvantageous partial filling of slots and for better utilization of the magnetic circuit, the slot form and size can be adapted to to the respective coil side occupancy. In such a case, the phase bands, for the pole pair number $p_2 = 2n$, over the individual poles is not identical. This leads to field harmonics of an order with one half fractions as well as even harmonics. Degradation of the harmonic content, however, occurs only for the even pole pair $p_2 = 2n$. The field waveform for $p_1 = 3m$ remains uninfluenced.

Two layer windings of the present invention having null winding branches and not having interspersed phase bands correspond, with respect to their harmonic leakage factors present for $p_2 = 2n$, to those of a conventional three-phase winding. Through the use of a phase interspersing, it is possible to obtain either an advantageous effective turns ratio which can be adapted over relatively wide limits or an advantageous flux density relation. However, this can result in increased m.m.f.-harmonic content. Since such harmonic fields have an adverse effect on operating conditions in, for example, an asynchronous machine, it is of interest, particularly in large machines to eliminate or reduce harmonics. By arranging two mutually staggered and-/or differentially designed partial windings which have their winding branches connected in series the harmonic content can be reduced to the same magnitude as in an optimum chorded two layer windings. In order to avoid expensive four layer windings, two layer windings with coils disposed side by side and divided in the middle can be used. Individual coils can also be combined in a well known manner to obtain easily manufactured phase band overlapping two layer windings. Such is disclosed in German Offenlegungsschrift No. 2,221,115. In addition, the balance of all winding branches connected in parallel, which is assumed in the explanation above, can be dispensed with if the equalizing currents which will then occur in the three base winding branches connected in parallel can be tolerated. In such a case, 6/4 pole three-phase windings can be realized as fractional slot windings, for example.

It is also possible to obtain 6/4 pole half slot windings with balanced winding branches which are thus free of equalizing currents if, as noted above, at least two coil sides are arranged in each slot layer. This measure permits machines with a relatively small number of slots for a pole pair number $p_1 = 3m$, even through 180° -spread phase bands with a correspondingly small winding factor are used.

In a winding branches in parallel connection to the base winding branches the number of turns are the same for both pole pair numbers so that for greatly different pole pair numbers large differences in the respective air gap induction are unavoidable. In order to reduce these differences in air gap inductions for the two pole pair numbers, the null winding branch can be disposed in a series connection with the base winding branches. This is possible in principle for any pole pair number ratio. The series connection is advisable in the interest of the desired equalization of the air gap induction if $p_2$ is greater than $p_1$.

In some pole changeable drives a square-law torque characteristic is desired with a correspondingly large difference in the power consumption for both pole numbers. In such cases, the current density in the null-winding-branches which are series connected for the higher pole number, can be in relation to the base winding considerable higher and an increased resultant number of turns thereby obtained. If, for example, the same coils are used for the null winding branches as are used for the base winding branches, then twice the number of turns is effective for the lower speed stage overall. The coils of the null winding branches carry three times the current carried by the base winding branches.

It is also possible to apply a low supply voltage to one of the pole pair numbers in well known manner, particularly through the use of series choke-coils or inductive voltage dividers. Instead of employing null winding branches which carry current only for the even pole pair number $p_2 = 2n$, a separate supplemental winding can also be provided for the other pole pair number $p_1 = 3m$. A uniformly distributed secondary winding can also be used for one of the pole pair numbers, the winding permanently connected with the terminals of that pole pair number.

BRIEF DESCRIPTION OF THE DRAWINGS

FIG. 3a is a circuit diagram for a 6/4 pole changeable winding.

FIGS. 3b–3l are diagrams illustrating winding locations and analysis of harmonic content for an interspersed three phase two layer winding with 36 slots for different coil pitches in accordance with FIG. 3a.

FIGS. 8a–8k and FIGS. 8α and 8β are are m.m.f. polygons for different interspersed winding variations of a 6/4 pole two layer winding having 72 slots.

FIG. 9a illustrates a winding arrangement utilizing partially concentric coil groups and corresponds to the m.m.f.-polygons of FIG. 8d. and 8a.

FIGS. 9b–9h illustrates windings and m.m.f. polygons for various single layer windings with and without null winding branches.

FIGS. 10α to 10η are m.m.f.-polygons for various sytems of interspersing for $p_1 = 3m$ with mutually staggered elementary groupings.

FIGS. 13a and 13c are diagrams illustrating a 6/4 pole fractional slot winding having 54 slots and non-balanced parallel branches.

FIG. 14 is a Table I listing the manner in which specific pole pairs meeting the general ratio can be obtained.

FIG. 15 is a Table II analyzing the various possible windings in accordance with FIGS. 3 and 4 and also comparing them with conventional three phase two layer windings.

FIG. 16 is a Table III providing an analysis similar to that of table II for windings with reduced m.m.f.-harmonic content in accordance with FIGS. 6 and 7 of the present invention.

FIG. 17 is a Table IV illustrating interleaved phase bands distribution factors and various characteristics for interspersed 6/4 pole two layer windings such as those illustrated in terms of their m.m.f.-polygons on FIGS. 8a–k and 8α and 8β.

FIG. 18 is a Table V illustrating the various possibilities of interspersing for $p_1 = 3m$ with mutually staggered elementary groupings, the variations corresponding to those illustrated on FIGS. 10α to η.

FIGS. 19a and 19b are a Table VI illustrating the upper layer of coil sides for a 108 slot winding and an 18/4 n pole changeable winding according to the present invention.

FIGS. 20a and 20b are a Table VII summarizing the different possible variations of the present invention and their properties, i.e. advantages and disadvantages.

DETAILED DESCRIPTION OF THE PREFERRED EMBODIMENTS

Prior to describing in detail the various embodiments of the present invention, a number of basic definitions of terms used will be given. Winding-branches are a group of series connected coils. Each winding-branch always has the same number of coils. Each phase of the three phase winding is composed of several winding branches. A slot-vector-star or slot star diagram indicates the phase relation of the individual slots in electrical degrees. A separate slot star must be drawn for each respective pole number. A coil-side-star diagram is similar to a slot-vector-star and has the same numbering. However, it relates to the coil sides lying in one respective slot layer. Phase bands are sections, taken over the circumference of the machine, and sectors in the coil-side-star diagram which are occupied by coil sides of the same phase or same winding branch. The distribution axis is the line of symmetry of a phase band.

Figure 1:
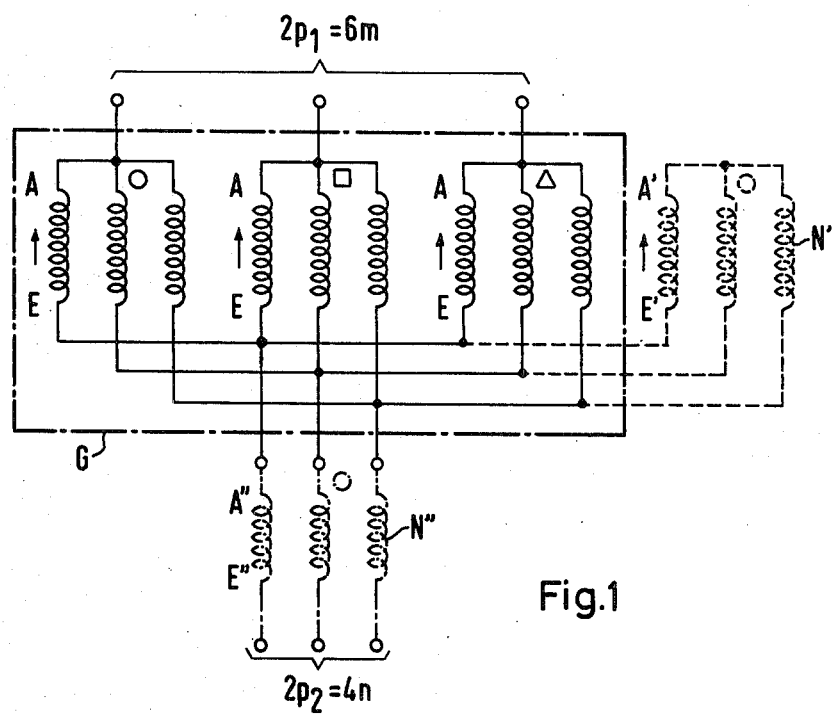
FIG. 1 illustrates a general circuit diagram of the winding branches of the present invention illustrating both parallel and series null winding branches.

FIG. 1 illustrates the general circuit arrangement for a three phase winding according to the present invention. Shown thereon is what is referred to as the base-winding G which is present in all embodiments. It is formed of nine base winding branches which are shown solid. Each of the base winding branches is composed of the same number of series connected winding coils which are not shown in detail on the figure. The respective three beginnings A of the individual base winding-branches identified by a circle, triangle or square are connected with each other and form the three connecting points for $2p_1 = 6m$ pole operation. These symbols, i.e. the circle, square and triangle, are used throughout the specification in describing the various embodiments and in each case describe the correlation of the winding branches or the winding coils with the three phases for $p_1 = 3m$. Three ends E of individual base winding branches which for $p_1 = 3m$ belong to different phases are connected to each other and lead to the three connecting points for the $2p_2 = 4n$ pole operation. As is clear from Table I of FIG. 14 discussed below, m and n are integers. This is also demonstrated by the example of FIG. 3a where $2p_1=6$ and $2p_2=4$, i.e., $p_1=3$ and $p_2=2$ and $m=1$ and $n=1$. In this manner, three parallel base winding branches always form a common phase for each pole number. There is a triple-star-connection for both pole numbers where the connecting points of the respective pole number always combine three basic winding-branches while the connecting points of the other pole number form star-points of equal potential which can remain separated. For changing poles, it is simply necessary to disconnect the one connecting point set from the power system and connect the connecting points for the other pole number.

In order to obtain uniform utilization, the winding branches of the base windings fill only three-quarters of the available slot cross sections that can be wound. It is of great advantage that the remaining slot layers be occupied by the coil sides of a separate winding referred to as the null branch winding which has winding branches symbolized in FIG. 1 by a dashed circle. On the FIG., two null branch windings are shown, one designated N' and the other N''. In each case, there are three winding branches. Those of the null-branch-winding N' shown in dashed lines and those of the winding branch N'' in dash-dot lines. Normally, only one of these windings will be used in the manner explained below.

In one type of embodiment a parallel connection in which the null-winding-branches N', shown dashed, is used. As illustrated, the beginnings A' of these windings are connected with each other and their ends E' connected individually to the connecting points of the base winding for the $2p_2 = 4$ pole operation. The second type of embodiment is referred to as the series connection of null winding branches and includes the null winding branches N''. As illustrated, their beginnings A" are connected with the common points of the basic winding for $2p_2 = 4$ pole operation with their other ends E" forming the actual connecting points for this operation.

In the first case, using the parallel connection, the winding coils of the null winding branches must be wound with the same number of turns as the base winding. In the second case for the series connection, for $p_2 = 2n$, they must be wound with a number of coil turns reduced by a factor of 3 with a corresponding increase in conductor cross section in order to obtain uniform current density and an unchanged m.m.f.-curve.

In principle, it is also possible to implement the null branch coils with a combination of series and parallel connection, i.e. to provide both null winding branches N' and N". These must be matched to each other with respect to the number of coil turns and the conductor cross section.

Figure 2A:
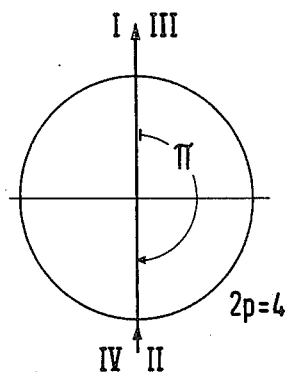
FIGS. 2a–2e are diagrams illustrating vector relationships, and the location of phase-bands and phases in the slots vector stars for a 4/6 pole change over.
Figure 2B:
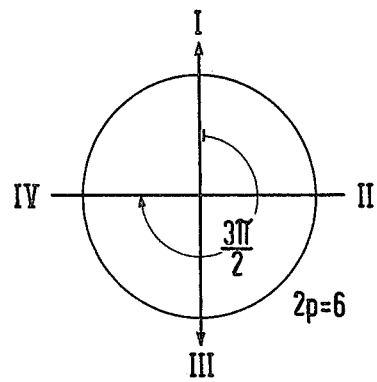
Figure 2C:
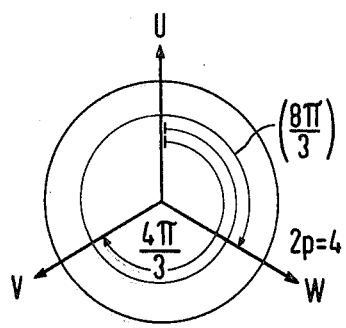
Figure 2D:
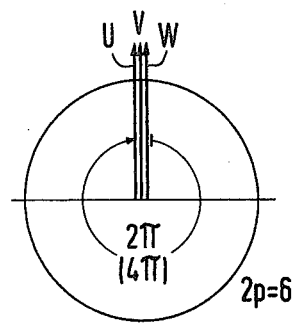
Figure 2E:
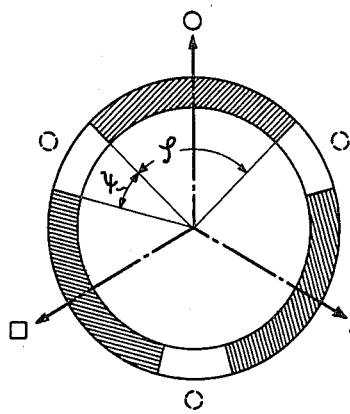

The theoretical foundations upon which the present invention is based can be best understood with reference to FIGS. 2a-2e. On FIG. 2a, the distribution axes I–IV of one phase lie in the same direction on the 4 pole coil-side-star or slot-vector-star illustrated thereon if the three phases are uniformly distributed over the circumference. In 6 pole operation, on the other hand, all of the angles of the coil side star are magnified in the ratio of 6/4 so that the 4 distribution axes I–IV of the 4 pole winding form a right angle cross as illustrated by FIG. 2e.

The axes U, V and W of all three phases of a 4 pole three phase winding which, as illustrated by FIG. 2c, are uniformly distributed over the circumference for $2p_2 = 4$ pole operation come into coincidence for 6 pole operation as shown by FIG. 2d. Overall, all the coils sides form a doubly congruent star with quadruple equiphase vectors for 4 pole operation and a triply congruent star for 6 pole operation. The phase bands of a conventional 4 pole winding which have a 60 electrical degree spread, are expanded to 1½ times that amount, i.e. to 90 electrical degrees spread for 6 pole operation.

By connecting the four phase bands (I–IV) which are associated with each pole for $2p_2 = 4$ parallel to a three phase star-branch, a symmetrical four phase system with six poles can thus be obtained. Such is described in German Pat. No. 653,974.

A division of each 4 pole phases into four equivalent parallel branches of which, in 6 pole operation, three of which form a symmetrical three phase system and fourth represents the outwardly ineffective null winding branch shown by a dashed circle, is accomplished according to the present invention with the aid of the 6 pole coil side star shown on FIG. 2e. On this diagram respective coil sides which are cophasal induced for $2p_2 = 4$ form a right angle cross (see FIGS. 2a and 2b). In the correlation according to the present invention as illustrated by FIG. 2e, each of these vectors lies in a different sector identified by a triangle, square, circle or dashed circle indicating the association with the individual winding branches. The coil sides which appear in FIG. 2e as adjacent vectors are, of course, not usually accommodated geometrically in immediately adjacent slots but may be removed from each other by 1, 2 or more pole pitches. The same number of coil sides fall into the different sectors of the 6 pole coil side star of FIG. 2e if the angles are:

$$\psi = \zeta/3 = 30° \text{ el and } \zeta = 90° \text{ el}.$$

Such a division is always possible if the distribution of the 4 pole phase winding is the same for each pole. An interspersing has no effect on the ability to realize this relationship.

In the design of the winding, the division of the 4 pole phases into four respective cophasal branches with the aid of the 6 pole coil side star of FIG. 2e need only be done once. The other two phases are always designed in the same manner and arranged mutually displaced by one-third of the circumference. As shown by FIGS. 2c and d, they then come to lie with complete coincidence in the 6 pole coil side star.

A similar situation holds for any other pole number ratio $p_1 : p_2 = 3m : 2n$, if, in general, $m \neq n > 1$. Also, with such an arrangement, the four cophasal vectors in the $p_2 = 2n$ pole pair coils side star always result in a right angle cross in the $p_1 = 3m$ pole pair star diagram which can be correlated in a similar manner with the individual branches of the base-winding and null-winding-branches. Slots or coil sides accommodated therein correspond to the vectors mentioned and are geometrically removed from each other by exactly one-quarter of the circumference. The total of $4n$ distribution axes of the even number of pole pairs (corresponding to FIG. 2a for $n = 1$), in the case of pole pairs numbers divisible by 3 are spread out to form a symmetrical star which has $4n$ rays (vectors), i.e. it consists of $n$ right angle crosses (FIG. 2b for $m = 1$). As for a symmetrical correlation of the different sectors as illustrated by FIG. 2e, which sectors always correspond to one winding branch, 4-axes symmetry is sufficient. The fractional slot windings with $q_2 = z/n$ slots per pole and phase can always be realized for larger pole pair numbers $p_2 = 2n$ with $n > 1$. Examples of this are shown in FIG. 11 which is described in more detail below where $n = 2$ and $q_2 = 3/2$ slots per pole and phase as well as in the compilation of Table VI of FIGS. 19a and 19b.

Table I of FIG. 14 gives a systematic listing of the pole number ratios which can be obtained in a three-phase winding according to the present invention in which the windings have the main characteristic noted above on page 4 in the paragraph numbered 1 in which three coil sides which, for $p_2 = 2n$, belong to the same phase and are equiphasal induced are arranged in three of four respective slots appearing in the $p_2 = 2n$ pole pair slots-vector star as vectors with the same direction.

FIG. 3a is a circuit diagram illustrating in more detail a 6/4 pole three phase winding having null winding branches arranged in a parallel connection to the base winding. This is a symmetrical two layer winding distributed in 36 slots, i.e. N = 36 with winding coils which are identical throughout and are made with a coil pitch of W = 6. In FIG. 39 the slot in which the left coil side (upper layer) lies is indicated. The minus signs indicate coils with opposite current flow. The basic-winding-branches are designed by a circle, square and triangle and the null winding branches by a dashed circle. The beginnings A of the three winding branches belonging to each phase for $2p_1 = 6$ are directly connected with the connecting points $U_6$, $V_6$, and $W_6$. The ends E of the basic winding and the null-winding-branches which are equiphasal induced for $2p_2 = 4$ are connected to each other and each brought out to connecting points $U_4$, $V_4$ and $W_4$, respectively. The three beginnings A' of the null winding branches are directly connected with each other and are not brought out.

Figure 3B:
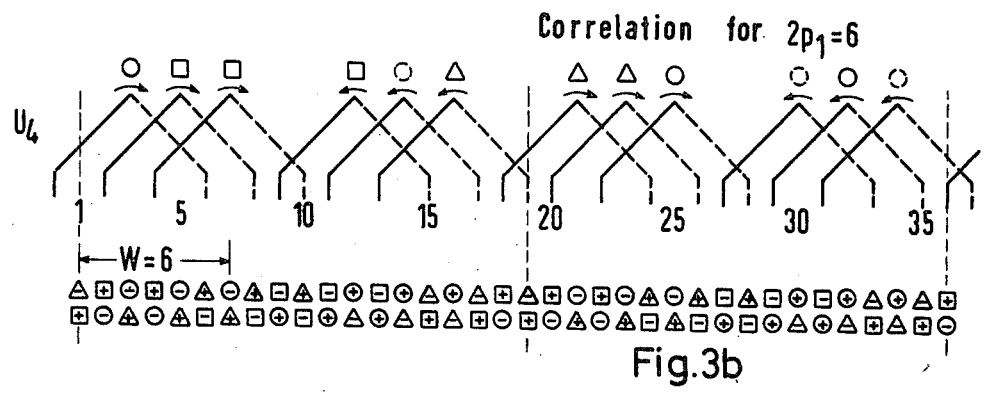

FIG. 3b illustrates the winding coil arrangement at the top with a phase band plan below. This is for the phase $U_4$ in 4 pole operation with the phase bands are symetrically interspersed sides. The correlation between FIG. 3a and FIG. 3b is evident. Note that associated with the phase $U_4$ are the windings of the branch desginated with a circle which are found in slots 36, 29 and 22, those designated with a square in the slots 2, 4 and 9, those designated with a triangle in the slots 13, 18 and 20 and those designated with a dotted circle in the slots 11, 31 and 27. The coil-side-star for 4 pole operation, showing only the upper layer of coil sides of this one phase leading to the connecting point $U_4$ are shown on FIG. 3c. Once again, the correlation with circles, squares, triangles and dashed circles along with the designation of slot numbers for this coil side are given.

FIG. 3d shows the 6 pole coil side star. With reference to these figures it can be seen that, of each 4 coil sides which are cophasal induced in 4 pole operation, 3 are assigned to winding branches of the basic winding belonging to different respective phases for $2p_1 = 6$ and the fourth one to a null-winding-branch. Take for example the coil sides 2, 20, 11 and 29 the latter two of which are negative. Of this group, from the squares, triangles, circles and dashed circles, it can be seen that the above noted relationship exists. With reference to FIG. 3d, these same coil sides in 6 pole operation form a right angle vector cross. Note that the opposite sides 11 and 29 both have negative signs and that the opposite sides 2 and 20 both have positive signs.

Overall, the individual coil sides of FIG. 3d form a phase band-arrangement which corresponds to FIG. 2e, each with base winding sectors or phase bands consisting respectively of three vectors and therefore having a spread of 90 electrical °. On the figure the distribution axes $U_6$, $V_6$, and $W_6$ are shown. In the presentation with the positive and negative signs indicating a positive or negative current flow direction it is evident that not all coil sides belonging to a common sector as far as induced voltages are concerned appear in FIG. 3 as directly adjacent vectors. Thus, the middle vector of each base winding sector, for example, is always diametrically opposite and has a negative direction. The basic presentation shown on FIG. 2e, on the other hand, has positive orientation throughout, curved exclusively according the phase-relation of the induced voltage, without consideration of the geometrical location of the coils.

The two other phase windings connected to the connecting points $V_4$ and $W_4$ are designed in the same manner as the phase $U_4$ shown on FIG. 3b and are divided into four widing branches each, the geometrical location always being mutually shifted by one-third of the circumference i.e., twelve slots.

Figure 3E:
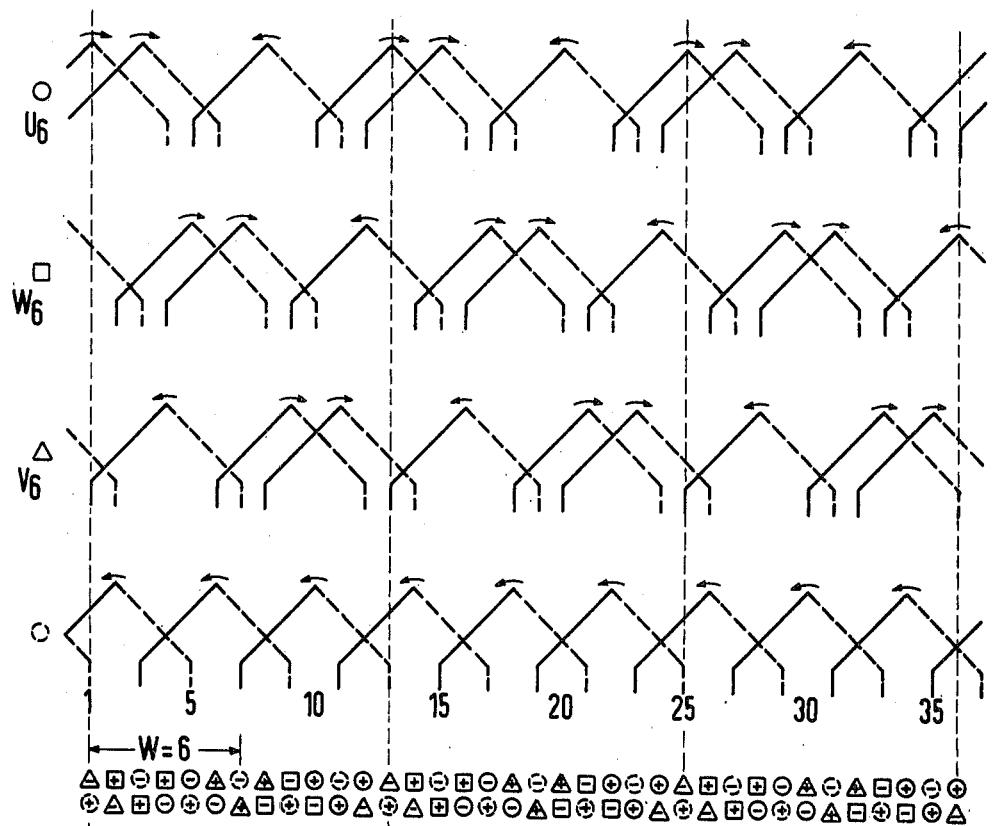

FIG. 3e illustrates the three phases of the base winding, the entire null branch winding and the phase bands obtained in 6 pole operation. As will be seen, not only is the coil side distribution symmetrical and the same from pole to pole, but there is also a coil distribution which is identical for all phase windings for both pole numbers. As a result the leakage reactances of the end-winding overhang are completely symmetrical.

In 6 pole operation the null winding branch carries no current. As is evident from the coil side star of FIG. 3d, the three series connected coils of each null winding branch form a symmetrical, three vector star. In other words the coil voltages induced therein add up to zero. In 6 pole operation only three quarters of all winding coils i.e., the base windings alone, carry current. Although this leads to a reciprocal, relatively high current density, it is generally thermally permissable since the power and current consumption are also correspondingly smaller for a larger number of poles. A similar situation exists, incidentally, even with the known Dahlander or PAM pole changing systems utilizing double star/delta connections where the entire winding does carry current. In those arrangements also, there is a current density which is relatively higher in the ratio of $2/\sqrt{3}$, referred to the respective phase current in the delta stage.

Figure 3F:
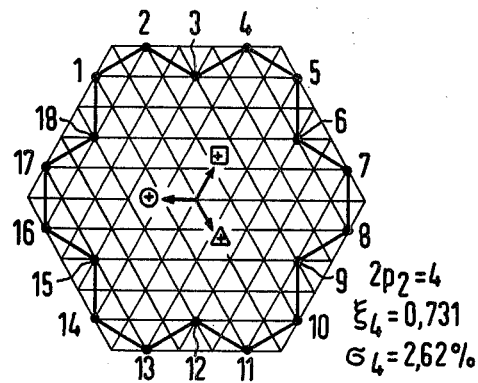
Figure 3G:
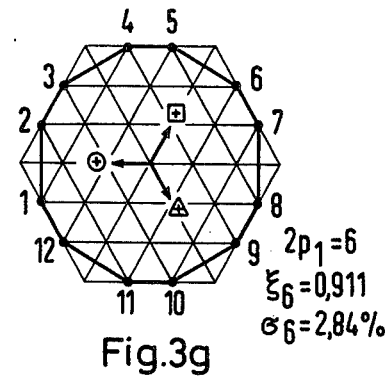

From the phase band plans, Goerges m.m.f.-polygons as shown in FIGS. 3f and 3g can be determined directly for 4 and 6 pole operation. These polygons represent a polar diagram of the stair-like m.m.f. curves. The waveform can be obtained from these from any desired point in time in a simple manner projecting polygon points corresponding to the slots on an appropriate grid.

The Goerges polygon conveys a rather illustrative picture regarding the kind and magnitude of the m.m.f. harmonics present. For example, lack of polar symmetry indicates that even harmonics are present. A polygon which is closed only after several revolutions indicates what are known as subharmonics. In addition to such rotating harmonic fields, alternating fields can also be excited if the moments of inertia of the polygon points corresponding to the slots are different for two orthogonal axes of gravity.

The two polygons of FIGS. 3f and 3g are symmetrical with respect to six axes so that only odd harmonic fields of the order:

$$\nu = 6K \pm 1 \ (k = 1, 2, 3 \ldots) \text{ m.m.f.}$$

are produced. The total harmonic content which is expressed qualitatively as a deviation from the circular shape is described by a harmonic leakage factor which can be calculated as follows $$\sigma_o = (R_g/R_1)^2 - 1$$

from the polar moment of intetia $Jp$ of all N points of the Goerges polygon (see Archiv Elektrotechnik 29, 1935, page 599). In this equation $R_g$ and $R_1$ are the inertial radii for the polygon and the fundamental circle which are:

$$R_g = (JP/N)^{1/2} \text{ and } R_1 = (N\xi)/(p\pi) \text{ or } (N'.\xi)/(p\pi)$$

where $\xi$ is the fundamental winding factor and N the number of slots and N' is to be substituted for N if not all slot layers carry current. In the present case, the full number of slots is $N = 36$ for 4 poles. For 6 poles, however, $N' = 27$ which is substituted into the equation since one quarter of the coils are ineffective. On FIGS. 3f and 3g the values of the harmonic leakage factors calculated in this manner, along with the associated winding factors, are indicated. A comparative review with further variants described below for $N = 36$ slots is given in Table II of FIG. 15.

Figure 3H:
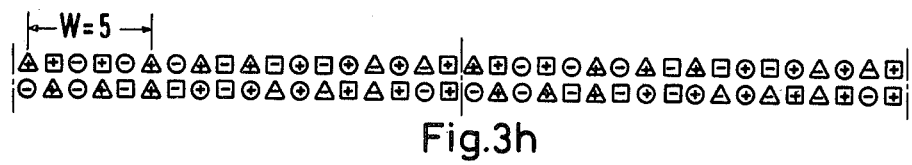
Figure 3I:
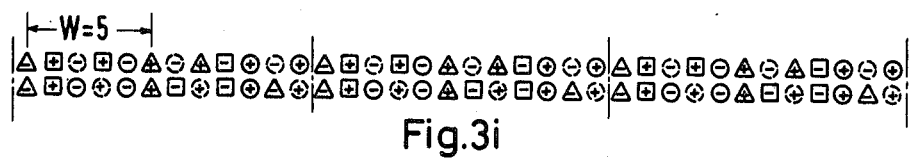
Figure 3K:
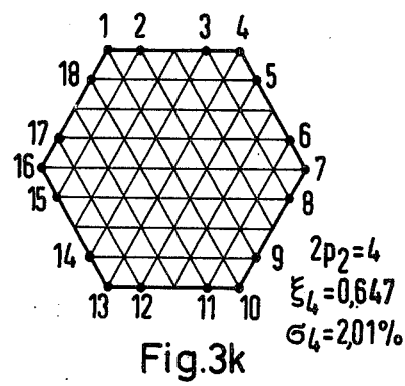
Figure 3L:
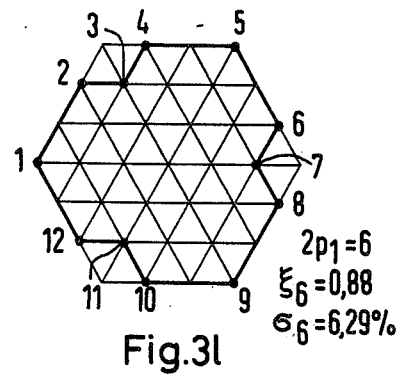
Figure 4A:
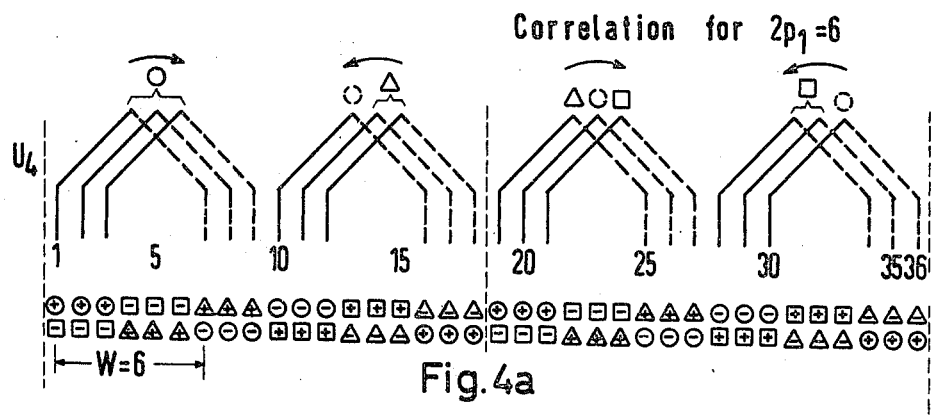
FIGS. 4a–4h are similar diagrams for a non-interspersed 6/4 pole changeable three phase two layer winding with 36 slots.
Figure 4D:
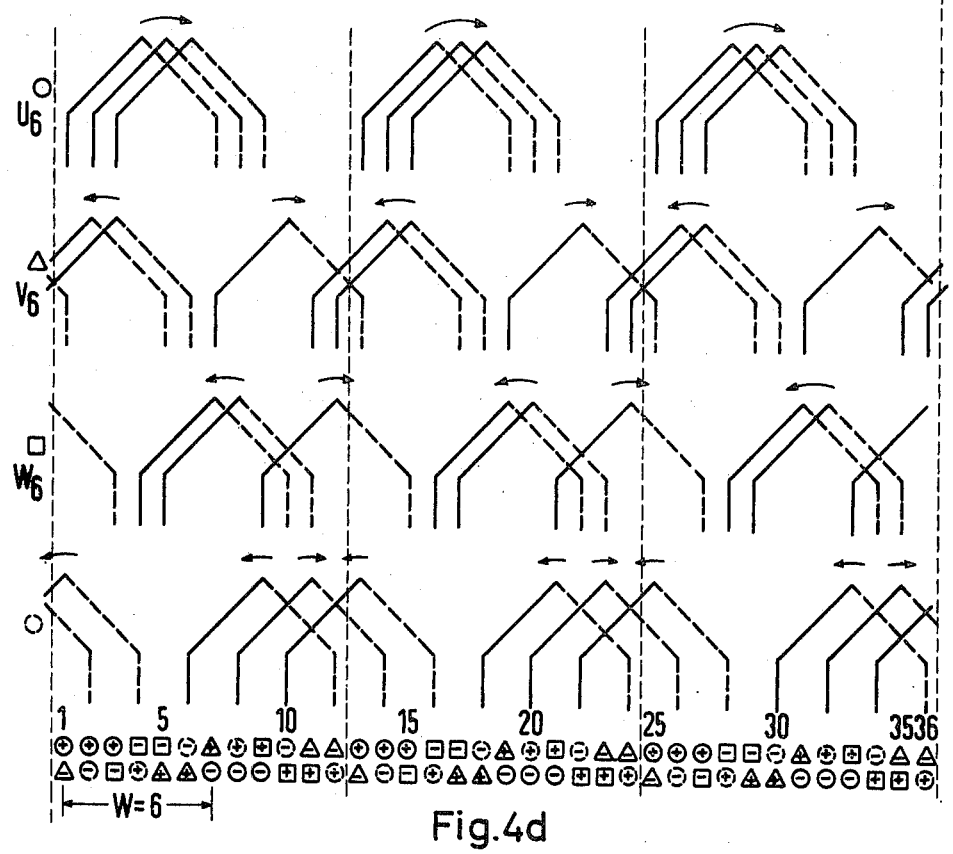
Figure 4B:
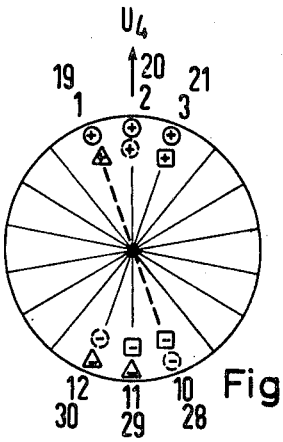
Figure 4C:
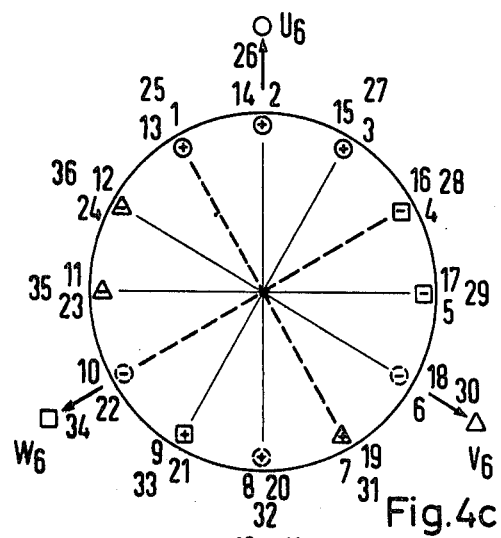
Figure 4E:
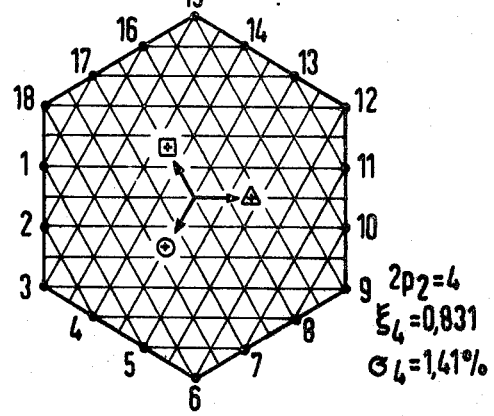
Figure 4F:
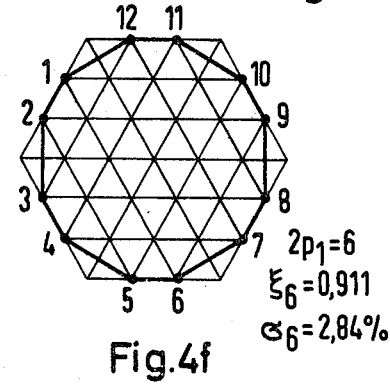
Figure 4G:
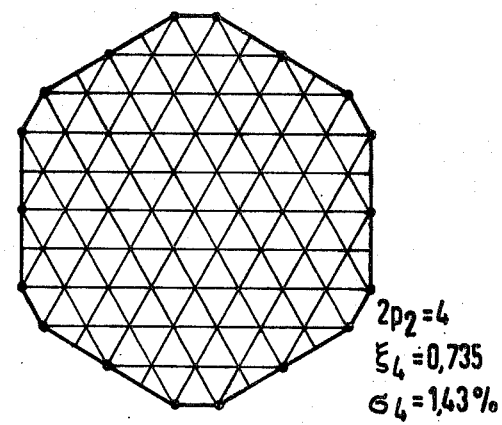
Figure 4H:
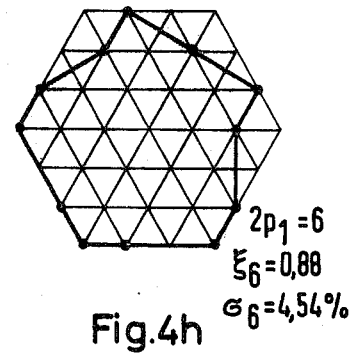
Figure 5A:
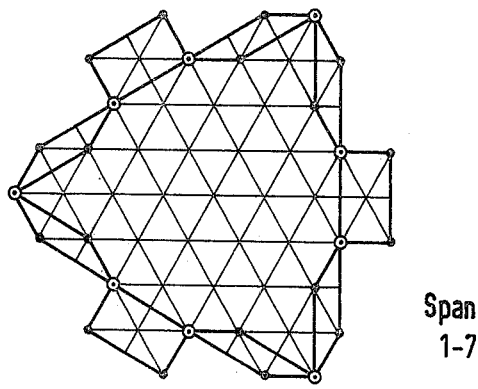
FIGS. 5a–5f are similar diagrams for three phase windings without null winding branches.
Figure 5B:
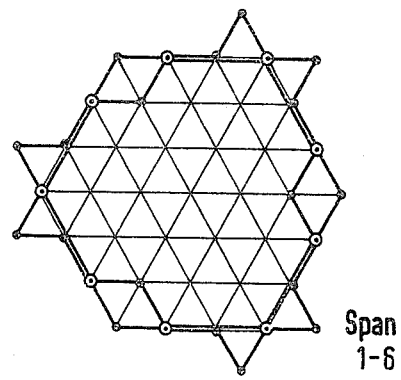
Figure 5C:
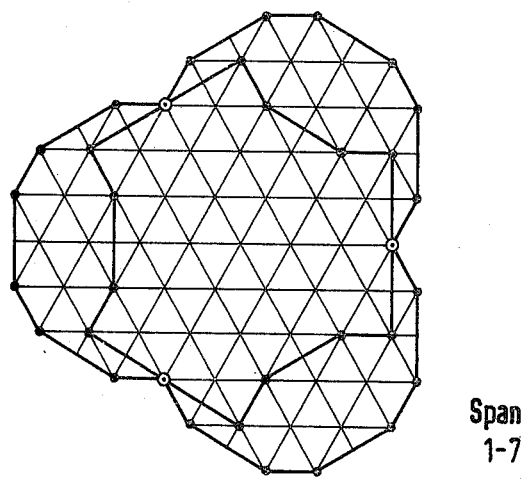
Figure 5D:
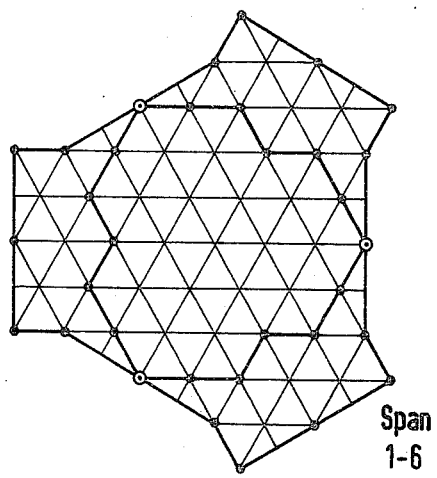
Figure 5E:
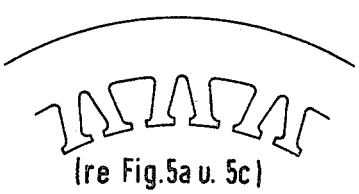
Figure 5F:
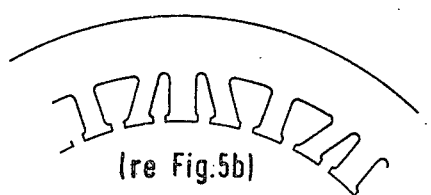
Figure 6A:
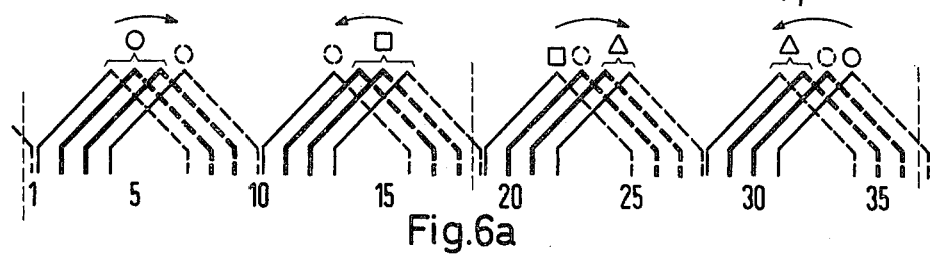
FIGS. 6a–6e and FIGS. 7a and 7b are similar diagrams for different low m.m.f. harmonic content 6/4 pole windings with 36 slots.
Figure 6B:
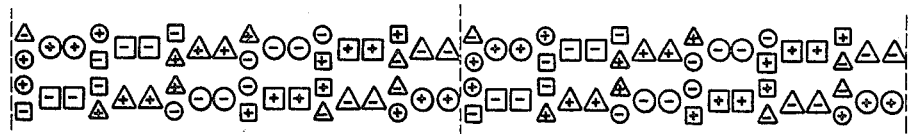
Figure 6C:
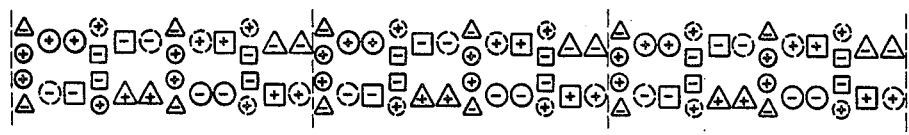
Figure 6D:
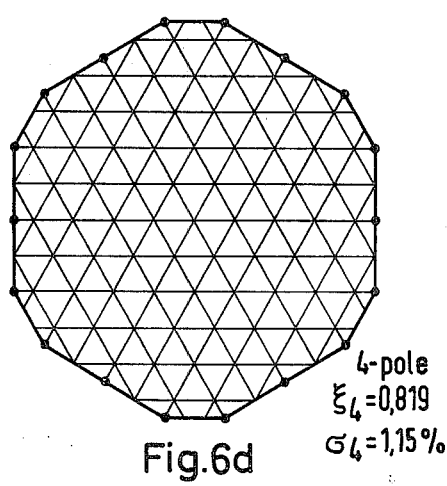
Figure 6E:
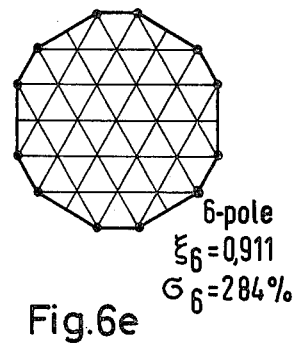

The coil span $W = 6$ corresponds to the pole-pitch for $2p_2 = 6$ i.e., it is a span from slot 1 to 7. By shortening the span, the induction ratio $B_4/B_6$ can be made to approach the value 1. This ratio which in the above described embodiment is equal to 0.831 is already favorable and such a change to bring it closer to 1 further improves performance. If the shortened coil span of $W = 5$ i.e., a span from 1 to 6, is provided, phase bands such as those illustrated by FIGS. 3h and 3i are obtained. For 4 pole operations the m.m.f. polygon 3k applies Clearly this is a very favorable field waveform and has only odd harmonics of the order $\nu = 6k \pm 1$.

On the other hand, the m.m.f. polygon of FIG. 3i which occurs in 6 pole operation has only three axes symmetry. As a result even harmonics of the order $\nu = 3k + 1$ occur. This results from the fact that in the 6 pole phase bands arrangement of FIG. 3$i$ there is repetition only after each pole pair because of the shortened coil pitch.

Another 6/4 pole two layer winding for $N = 36$ slots is shown in FIG. 4. For 4 pole operation each phase winding, as illustrated by FIG. 4$a$, has a conventional symmetrical 60° spread arrangement. Once again, the coil span $W = 6$ corresponds to the pole pitch for 6 pole connection and to a two-thirds chord for 4 pole operation. Once again all coils have the same number of turns and parallel connection of the null winding branches is also provided.

The correlation to the individual winding branches of FIG. 4$a$ above the coils is found by means of coil side stars. Of each four coil sides which are equiphasal induced during 4 pole operation and appear in FIG. 4$b$ with vectors with the same direction, three are associated with the base-winding-branches and the fourth with a null winding branch. For example, consider the sides 1, 19, −10, and −28. Coil sides 1, 19 and −28 are associated with base winding branches and the fourth, −10, with the null winding branch. In the 6 pole coil side star of FIG. 4$c$ these same sides form a right angle cross. Once again, overall, for 6 poles as illustrated by FIG. 4$c$ an arrangement of base winding sectors having 90° el spread, the symmetry axes of which are shown, and interposed null branch sectors having 30° spread are obtained.

The phases which are obtained during 6 pole operation and which consist of three parallel connected base-winding-branches are shown in FIG. 4$d$. This figure includes the null winding branches. Below the winding branch diagrams is the resulting phase band distribution plan. The phase bands are symmetrically distributed from one pole to another. The overhang distribution shown by FIG. 4$c$, on the other hand, is unequal in 6 pole operation. Since, in the phase marked with a circle, groups of three are always adjacent while on the other two phases groups of two and single coils alternate as clearly illustrated in FIG. 4$d$. In 6 pole operation this leads to different leakage reactances of the three phases. In correspondence with the not interleaved, phase band distribution the 4 pole m.m.f. polygon shown on FIG. 4$e$ is an equilateral hexagon. In 6 pole operation the same polygon as in the previously described winding (cf. FIG. 3$g$) is obtained as shown by FIG. 4$f$. The six axis, symmetrical m.m.f. polygons according to FIGS. 4$e$ and 4$f$ show that in both cases only odd harmonic fields with $\nu = 6k \pm 1$ (with $k$ an integer) are produced the total content of which corresponds to that of conventionally used three phase windings with full or two-thirds chord (cf. Table II of FIG. 15).

This winding has a higher winding factor $\xi_4 = 0.831$ than the 4 pole phase interspersed embodiment of FIG. 3 and accordingly has a lower flux density relationship $B_4/B_6$. To raise this ratio the coil span can be reduced to $W = 5$. In the phase band plans the lower layer will then always be shifted one slot to the left as compared to FIG. 4$a$ and 4$d$, this not being shown in detail herein. The m.m.f. polygons which result from this arrangement will be as shown on FIG. 4$g$ and 4 poles and on FIG. 4$h$ in 6 pole operation. In the manner described above this latter arrangement will exhibit even field harmonics.

In Table II of FIG. 15, the 6/4 pole windings of FIGS. 3 and 4 are compared with each other and to the winding and harmonic leakage factors of conventional two layer windings.

If the 6/4 pole windings of FIGS. 3 and 4 are constructed without the null-winding-branches, the m.m.f. polygons of FIGS. 5$a$ through 5$d$ result. FIG. 5$a$ applies to a winding in accordance with FIG. 3$a$–$g$ having a coil-span $W = 6$ for 4 pole operation. FIG. 5$b$ is for winding in accordance with FIG. 3$h$ − 1 with a coil-span $W = 5$. Similarly FIGS. 5$c$ and 5$d$ illustrate the polygons resulting for 4 pole operation with the coil spans of 6 and 5 respectively in accordance with FIG. 4$a$–$h$. By omitting the null branch coils, the m.m.f. harmonic content in 4 pole operation is increased. In addition to even harmonics a 2 pole subharmonic also appears. In 6 pole operation, the field wave form remains unaffected since the null winding branches carry no current when operating in that mode.

Unwound null branch-phase gands (sector $\zeta$ in FIG. 2$e$) always causes the degradation of the shape of the m.m.f. wave form for the pole pair number $p_2 = 2n$ which is divisible by an even number. The entire winding (the base winding alone) then carries current in the same manner for both pole numbers. In order to avoid unfavorable partial filling of the slots such as would result from the same slot shape throughout, it is advantageous to adapt the size and shape of the slots to the respective coil side occupancy. The arrangement shown in FIG. 5$e$ is appropriate for the variations of FIGS. 5$a$ and 5$c$ whereas the arrangement of FIG. 5$f$ is appropriate for FIG. 5$b$. With such arrangement improved utilization of the magnetic circuit can be achieved with the tooth width between adjacent slots being the same throughout.

As was noted above it is best to keep harmonic content as low as possible particularly in larger asynchronous motors. Where such must be done, remedial action can be taken through the use of phase band overlapping two layer windings, two layer windings with adjacent double coils or by superimposing two partial windings (4 layer windings) which are mutually staggered and whose winding branches are connected in series. The coil arrangement of a 6/4 pole winding with reduced harmonic content in such a design, which is simple and utilizes phase band overlappd two layer windings with 36 slots, is shown in FIG. 6$a$. The corresponding phase band plans for 4 pole and 6 pole operation are shown in FIGS. 6$b$ and 6$c$. The 4 pole and 6 pole m.m.f. polygons are shown respectively in FIGS. 6$d$ and 6$e$.

Figure 7A:
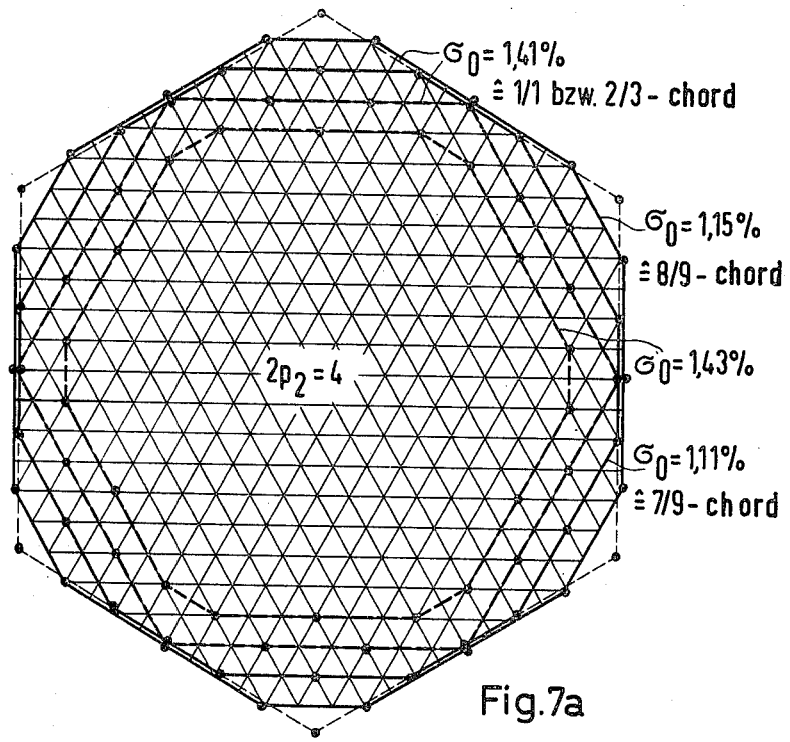
Figure 7B:
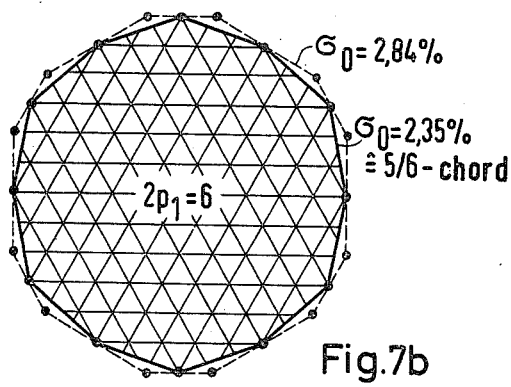
Figure 8A:
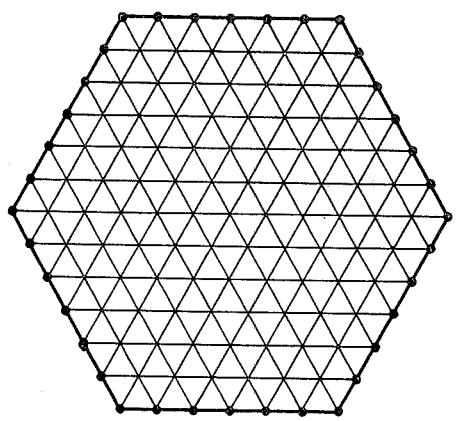
Figure 8B:
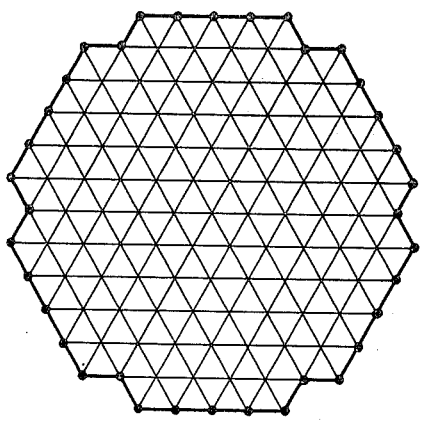
Figure 8C:
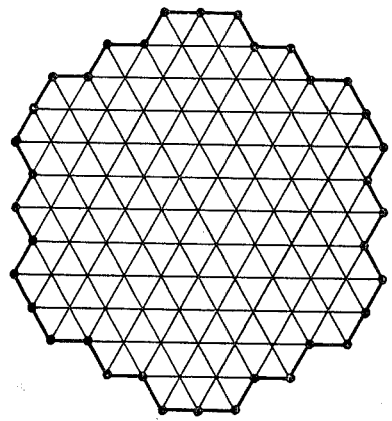
Figure 8D:
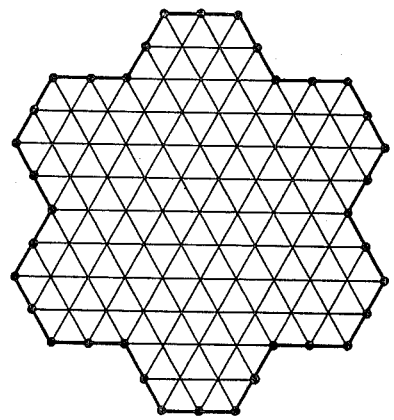
Figure 8E:
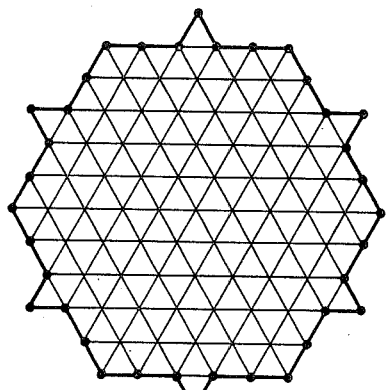
Figure 8F:
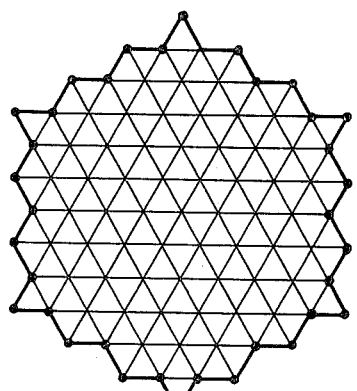

A review of different 6/4 pole windings for 36 slots which have a reduced harmonic content is given in Table III of FIG. 1$g$. Corresponding m.m.f. polygons for 4 pole and 6 pole operations shown in FIGS. 7$a$ and 7$b$ indicate improved field wave forms. The evaluated m.m.f. harmonic leakage factors $\sigma_o$ in percent are given in each case. Each of the partial windings which are arranged on top of each other and side by side and are staggered by one to four slots is in conventional manner with 60° degree spread according to FIG. 4$a$ and is designed with a coil span $W = 6$.

Thus, the lowest overall harmonic content is obtained with a displacement by two slots. It corresponds exactly to those m.m.f. waves which would be obtained with two separate windings on top of each other i.e., a 7/9 chord 4 pole and a 5/6 chord 6 pole two layer winding. The manufacturing cost of low m.m.f. harmonic pole changeable windings is about as high as that of separate windings. However, better machine utilization can be achieved. With separate windings only half the slot area is available for each pole number. In a pole changeable motor all of the slots are available for 4 poles and three quarters of the slots for 6 poles. With respect to a favorable utilization of the magnetic circuit, an induction ratio of $B_4/B_6 = \sqrt{4/6} = 0.817$ would be desired. For this value the yoke and tooth induction changes in the same ratio when the changeover is made. The present value $B_4/B_6 = 0.751$ differs from this by 8% which must be considered as a reduction of utilization. As a possible increase of the utilitzation over two separate windings one therefore obtains the following:

$$4 \text{ poles: } 0.92 \times \frac{0.781}{0.902} \times \frac{1}{0.5} = 1.59 \text{ times}$$

deviating B-relation / poorer efficiency / effective copper cross section $$6 \text{ poles: } 0.92 \times \frac{0.88}{0.933} \times \frac{0.75}{0.5} = 1.30 \text{ times}$$

Further variations of reduced harmonic content windings are obtained by starting out from differently designed partial windings, e.g., interspersed as $2p_2 = 4$ (FIG. 4) and/or varied coil pitches. The variation shown in the last line of Table III of FIG 16 with a displacement of four slots can alternatively be made with a coil span of 5 and a staggering by three slots.

The number of pole changeable, winding with reduced harmonic content of the present invention which can be obtained in this manner increases with the number of stator slots. Naturally, with a greater number of stator slots a greater variety of different partial windings can be formed by means of different distribution, i.e., by interspersing.

A review is given in Table IV of FIG. 17 for a pole changeable 6/4 pole winding distributed in N = 72 slots. This table helps explain the effective number of turns or flux density relations which are obtainable by means of interspersing and can be adapted in a relatively fine manner within wide limits. In this table under $a$ through $k$, a number of different distributions for a 4 pole winding arrangement is listed, all of which can be transformed into the changing pole system of the present invention into common 6 pole distributions $\alpha$ or $\beta$.

Corresponding to the variants $a$ through $k$ are the m.m.f. polygons shown on FIGS. 8a through 8k, i.e., these are the polygons for 4 pole operation. FIGS. 8$\alpha$ and 8$\beta$ illustrate the m.m.f. polygons for 6 pole operation. In these a coil span W = 12 corresponding to an unchorded winding, for the higher pole pair number for example is always assumed. The numerical values of the winding factors $\xi_4$ and $\xi_6$, the m.m.f. harmonic leakage factors $\sigma_o$ and the flux density relation $B_4/b_6$ given in the table are also based on this assumption. As with the other windings it is possible to change parameters through a change in the coil pitch. However, this leads to a 6 pole m.m.f. wave form with even harmonics. However, such can often be tolerated. By changing the coil span one slot, the 4 pole winding factor, for example, and thereby the flux density ratio $B_4/B_6$, can be increased and decreased by about 5% depending on whether or not the coil span is increased or decreased by one.

Of FIGS. 8a through 8k for the 4 pole distributions the m.m.f. polygons in FIGS. 8a to 8g are always symmetrical whereas the polygons of FIGS. 8h to 8k are asymmetrical. As indicated in Table IV of FIG. 17 by a dot and a circle, the latter were obtained by partial distribution, for example, in the odd slots of FIG. 3 and in the even slots of FIG. 4, and by arranging the distribution axes of these partial distributions, each of which is symmetrical in itself, such that it is displaced by 1, 3, or 5 slots.

In the distributions according to variants $a$ and $d$ of Table IV, two coil sides always lie side by side, which coils can be combined into a concentric coil group having coil spans 1 to 14, and 2 to 13 (a two layer winding with double coils). FIG. 9a illustrates a 4/6 pole winding design corresponding to the variation $d$, which is composed of coil groups of this kind. An analagous winding-arrangement can also be derived from variation $a$ of Table IV. Both coils can be wound with different numbers of turns without a change in the cophasality of the induced coil voltages. Depending on whether the effective number of turns of the higher or the lower pole number is to be increased, the inner or the outer coils will be wound with the higher number of turns. If the number of turns of one of the two coils is set to zero and the number of turns in the other doubled, a single layer winding is obtained such as that shown in FIG. 9b with a coil span of 1 to 14, i.e., w = 13. In a similar manner it is possible, starting from FIG. 9a to omit the respective outer coils to end up with a single layer winding having a span 1 to 12, i.e., w = 11.

Figure 9E:
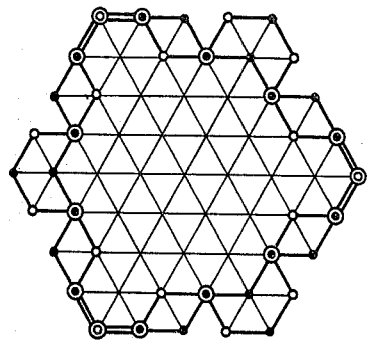
Figure 9F:
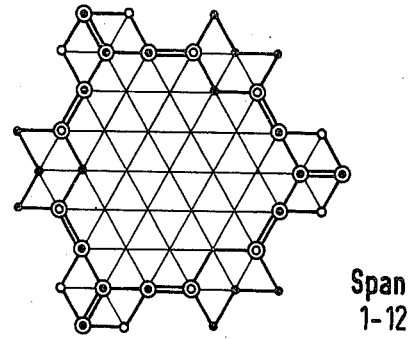
Figure 9G:
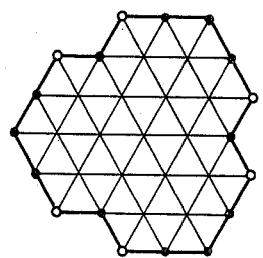
Figure 9H:
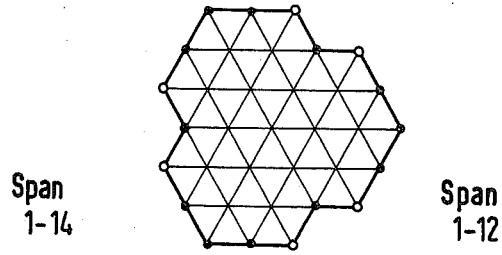

FIGS. 9c through 9h illustrate the m.m.f. polygons of the 6/4 pole single layer windngs which can be derived from FIG. 9a in this manner. Polygons are shown for both 6 pole and 4 pole operations in embodiments with and without wound null-branches. FIG. 9c is for a coil span 1 to 14, and 9d for a span 1 to 12, both for 4 pole operation and with null branch coils present. FIGS. 9e and 9f illustrate the increased harmonic m.m.f. content of the 4 pole wave form when the null branches are omitted. The polygon points marked with the circle signify double points stemming from current free slots. Such are present in the 6 pole ampere turn polygons of FIGS. 9g and h because of the fact that the null branches never has current in such operation.

Figure 10A:
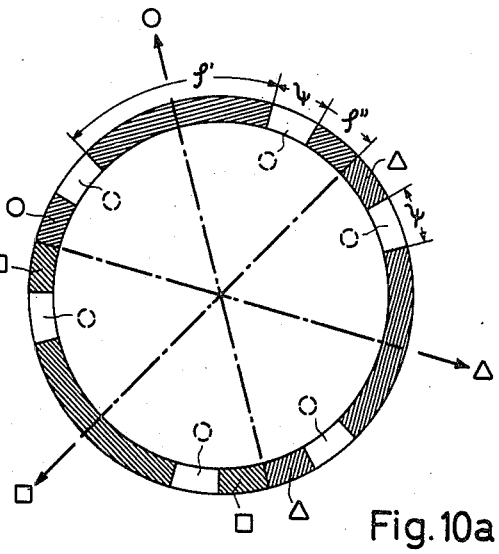
FIG. 10a is a diagram illustrating a winding arrangement with interleaving phase bands.

As described by the last line of Table IV of FIG. 17, i.e., variant $\beta$, and the corresponding m.m.f. polygon of FIG. 8 $\beta$ there are also possible variations regarding an interspersing with the pole pair number divisible by 3. The 6 pole phase band diagram corresponding to the example mentioned is shown in FIG. 10a. This arrangement is distinguished by an interleaved phase band arrangement in which the null-winding-phase bands are subdivided into elementary sectors of half spread $\Psi' = 15°$ and the other regions into central sectors $\zeta' = 60°$ wide which are flanked on both sides by sectors $\zeta'' = 15°$ wide. This example shows only one of the many possibilities of the present invention. The arrangement of FIG. 10a can be derived from the basic arrangement shown in FIG. 2e by providing 12 elementary sectors of half spread, i.e., spread $(30/2)° = 15°$ and arranging two such elementary distributions displaced by 45°. A further variant can be obtained with the same elementary distribution if the displacement angle is chosen to be 75°. However, the winding factor $\xi_{3m} = 0.722$ is already relatively small in this arrangement.

In general, the elementary sectors can be made $(30/k)°$el spread and, as is indicated in Table V of FIG. 18 for k = 3, differently interspersed distributions for the pole pair number divisible by 3 can be derived from every $k$ of such elementary distributions. The elementary distribution shown in Table V at the top corresponds to the arrangement of FIG. 2e. Three adjacent elementary sectors with an individual spread of $(30/k)°$ are always assigned to the same basic-winding-branch the distribution factor of which is therefore $\xi_z = (\frac{1}{3})(\cos 0° + 2 \cos 30°) = 0.9107$. The fourth is assigned to the respective null branch. Through a mutually displaced arrangement of three such elementary distributions, the individual variations $\alpha$ to $\eta$ are obtained. With increasing mutual displacement of elementary distributions, the winding factor becomes increasingly poor. The displacement factors, $\xi_v$, resulting from the displacement angles between individual elementary distributions are also given. FIGS. 10 $\alpha$ through 10 $\eta$ show m.m.f. polygons obtained from these individual variations for a two layer winding arrangement if a coil span equal to the diameter is present for the pole pair number $p_1 = 3m$ which is divisible by 3. These resulting distributions assume a sufficiently large number of slots per pole. While the distribution of FIG. 2e can be realized for a pole pair number divisible by 3 with $N/2p_1 = 6$ slots per pole, the distribution of FIG. 10a requires $N/2p_1 = 12$ slots per pole and the variations $\alpha$ through $\eta$ of Table V require at least $N/2p_1 = 18$ slots per pole. In general, at least $N/2p_1 = k \cdot 6$ slots per pole are required with the pole pair number $p_1 = 3$ for a subdivided elementary distribution which is subdivided $k$ times.

The above examples have been given in all cases for a 6/4 pole changeable winding. Examples for other pole number ratios will now be given.

Figure 11A:
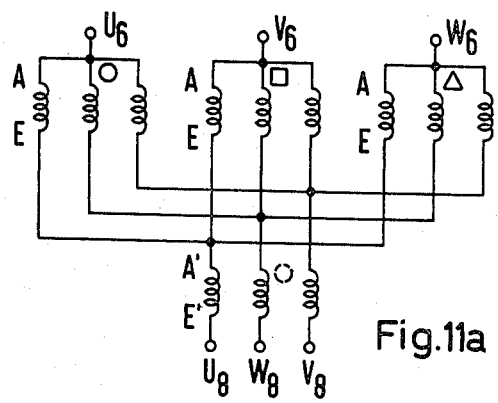
FIG. 11a is a circuit diagram of an 8/6 pole two layer winding arrangement.

FIG. 11a is a schematic illustration for 8/6 pole fractional slot winding with 36 slots. In this arrangement $q_2 = 1.5$ slots per pole and phase for the 8 pole connections and $q_1 = 2$ for the 6 pole connection. As illustrated, the three beginnings A of basic-winding-branches are connected and form the three connecting points for the $2p_1 = 6$ pole operation. The three ends E of the individual basic-winding-branches are connected to the beginnings A' of the three null winding branches, the ends E' of which form the three connecting points for the $2p_2 = 4$ pole operation. Thus, this is a series connection of the null winding branches and the basic winding.

Figure 11C:
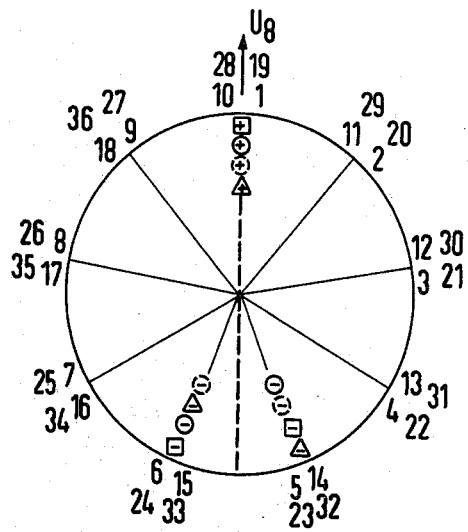
FIGS. 11b–11g illustrate particular details of such a winding along with showing its characteristics.
Figure 11D:
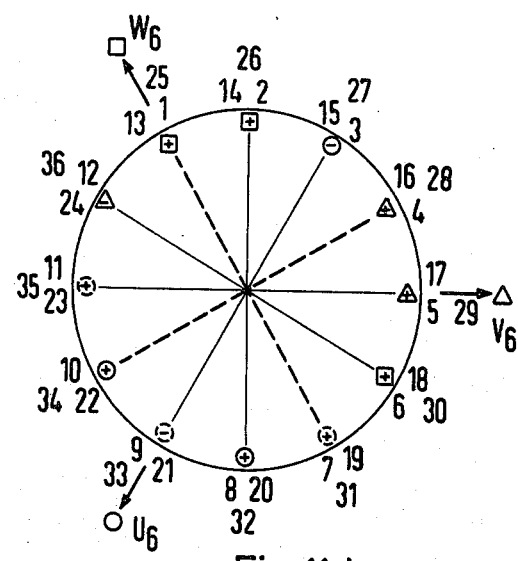
Figure 11F:
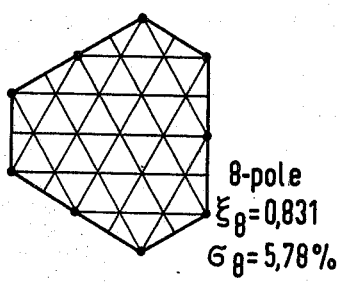
Figure 11G:
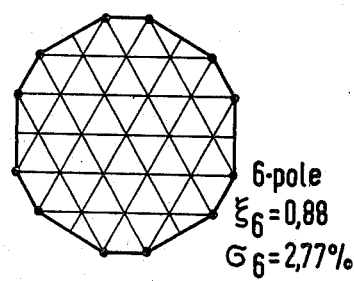
Figure 11B:
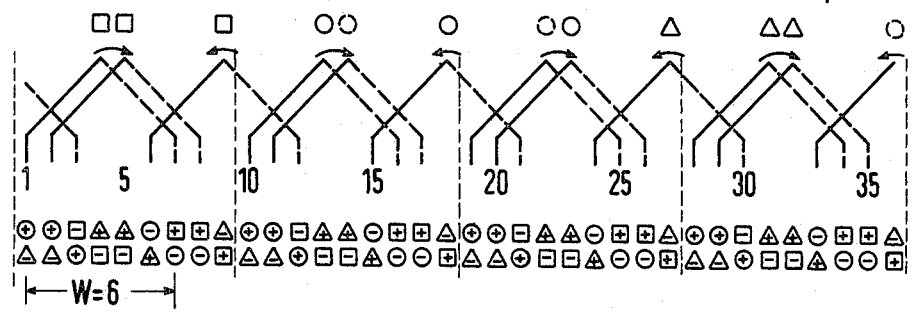

FIG. 11b illustrates the coil arrangement of a complete phase for 8 pole operation. It consists of three parallel acting base winding branches which are cophasal induced and a null winding branch also cophasal induced connected in series therewith. The correlation of the winding coils with the individual basic-winding-branches belonging to different phases for $2p = 6$ are once again identified by the circle, square and triangle. The dashed circle identifies the null winding branch coils. The coils of the series connected null-winding-branches are made with a number of turns which is reduced to one-third with three times the conductor cross section.

Figure 11E:
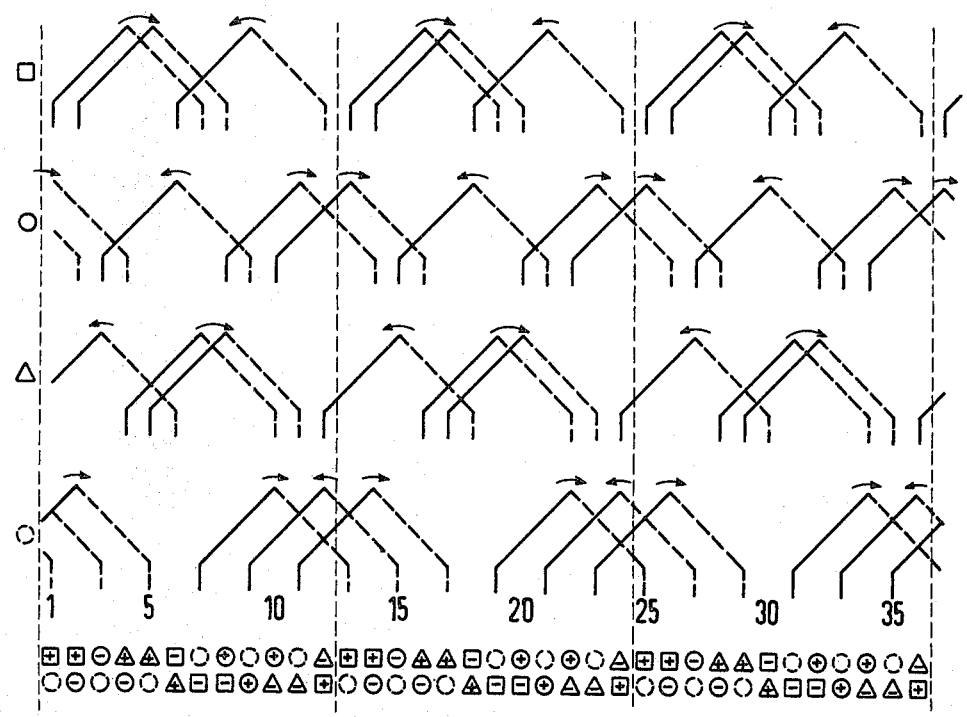

FIGS. 11c and 11d show the slot-vector-stars for the two pole numbers. It can be seen that the upper layer coil sides 1, 10, 19 and 28, which are equiphasal induced for 8 pole operation, are expanded out as to their phase relation for the other pole pair number to form a right angle cross. Each of the coil sides mentioned is associated with another winding branch. FIG. 11e shows the three phases for 6 pole operations as well as the null-branches which is outwardly ineffective. On this figure they are shown one below the other for greater clarity.

For $2p = 8$, each winding branch contains three winding coils which are equiphasal induced (cf. FIG. 11c). For 6 pole connection, as shown by FIG. 11d, the base winding branches identified by the above noted symbols form a symmetrical three phase system with a phase band distribution such as that of FIG. 2e. The voltages induced in the null winding branches add up to zero. The phase band-plans of FIGS. 11b and 11e, drawn in each case below the coils, indicate the current direction of the individual coil sides of each slot.

The Goerges polygons of FIGS. 11f and g are determined from the windings of the above figures and show that the overall m.m.f.-harmonic content is small despite the even harmonics which occur in the 8 pole operation. For the series connection of FIG. 11a an air gap induction ration $B_6/B_8 = 0.94$ is obtained.

Instead of the series connection of the null winding branches the same pole ratio can be realized by using the same coils for the basic-winding-branches and for the null-windings connected in parallel. Such can be done if there is less need for equalization of the air gap inductions. With a parallel connected arrangement, the air gap induction ratio is $B_6/B_8 = 0.71$. The m.m.f. waveform (the Goerges polygon) remains unchanged.

Figure 12A:
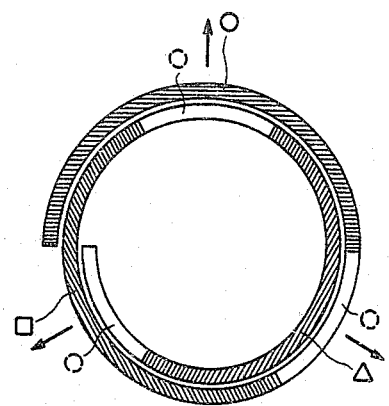
FIGS. 12a–12g are diagrams illustrating the characteristics of a 6/4 pole half slot winding with 18 slots and having windings zones 180° wide for $2p_1 = 6$.
Figure 19B:
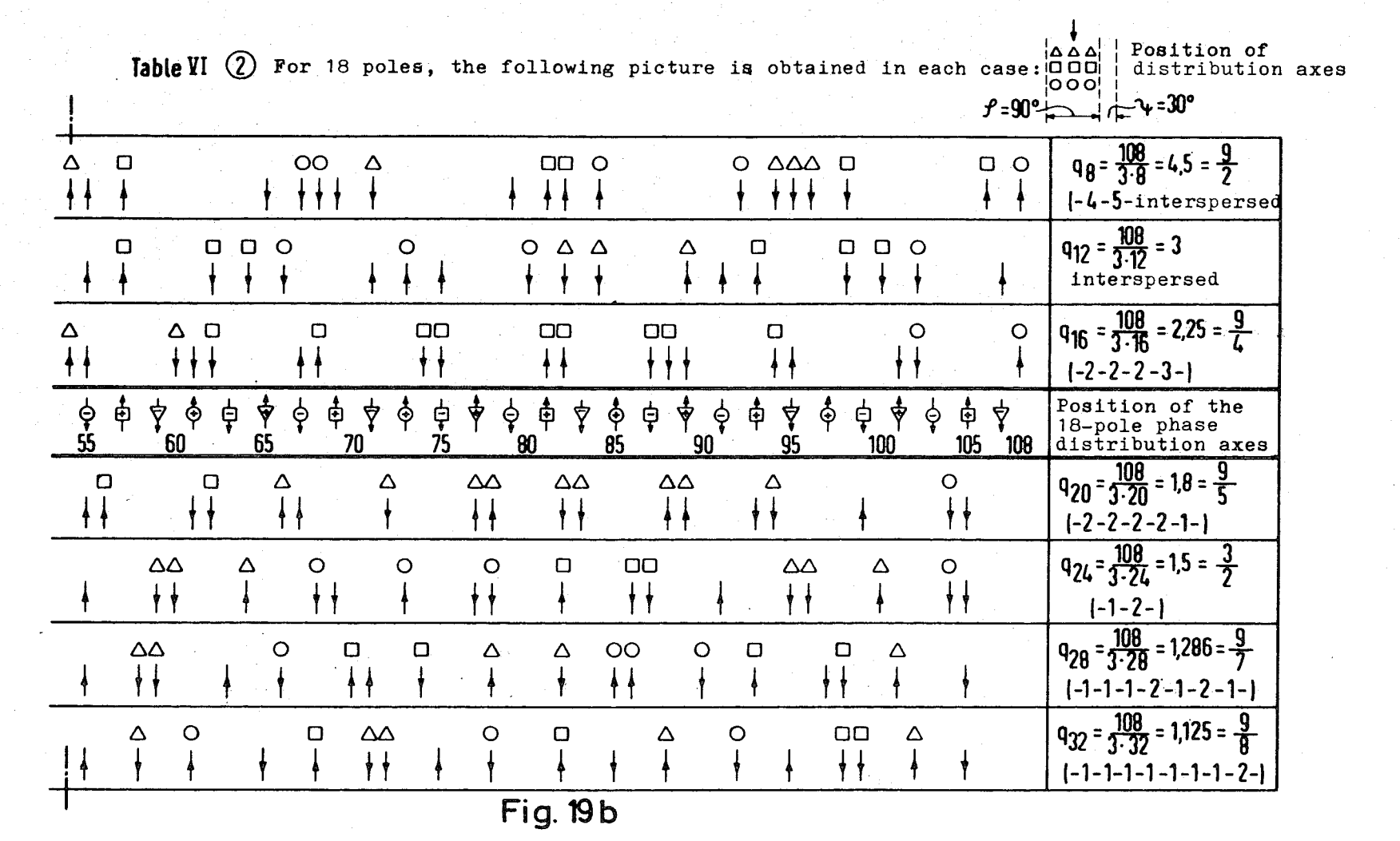

Further embodiments with $18/4 \ n \ (n = 2 \ldots 8)$, i.e., 18/8, 12, 16, 20, 24, 28 or 32 pole changeable three phase windings for $N = 108$ slots are illustrated by Table VI of FIGS. 19a and 19b. Only the upper layer coil sides of one phase for the pole pair number divisible by $2n$ is drawn, with the respective coil side correlation with the individual basic-winding-branches marked by a square, circle or triangle. The coil sides which are not separately marked are assigned to the null-winding-branch. The 18 pole phase band distribution corresponds in all cases to FIG. 2e. The distributions in the case of a pole pair number divisible by an even number are in part interspersed and partially realized as fractional slot windings with different numbers of coil sides from pole to pole. Detailed notes regarding this are made in the right column of Table VI. Contrary to the conditions which can be realized as shown by Table I of FIG. 14 on which all previous examples were based, there is also a possibility which needs a substantially lower number of slots. This corresponds to the second possibility given above on page 4 under the paragraph numbered 2. In such an arrangement coils split in the middle are used to create quadruply equiphasal vectors for the $p_2 = 2n$ pole pair coil side star and a distribution with 180° el spread phase bands as illustrated by FIG. 12a for $p_1 = 3m$. Accordingly, fractional slot windings with $q = z/(2n)$ are possible for $p_2 = 2n$. As an example, a 6/4 pole changeable winding for $N = 18$ slots is illustrated by FIGS. 12b to 12g.

Figure 12C:
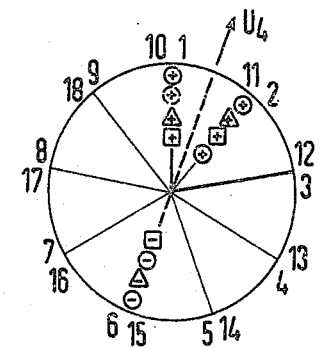
Figure 12B:
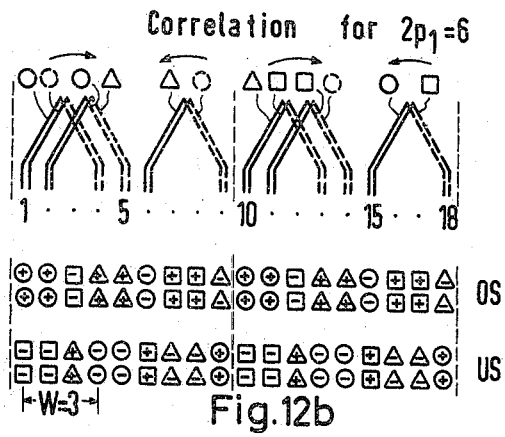
Figure 12D:
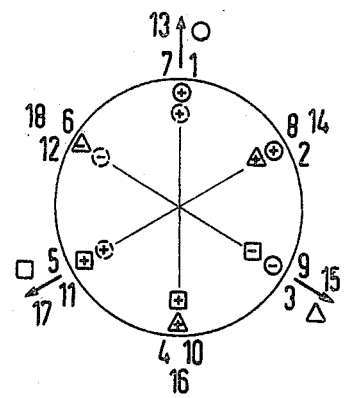
Figure 12E:
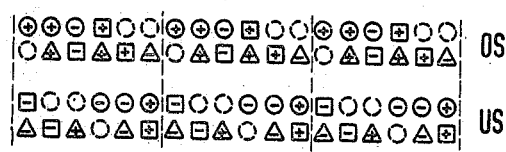
Figure 12F:
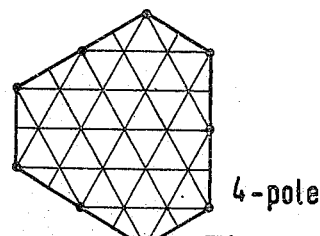
Figure 12G:
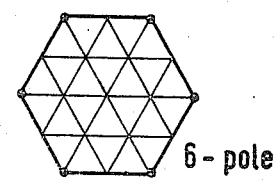

Due to the division of each coil into two halves, there is twice the number of winding elements and, with $N = 18$ slots, the number of cophasal induced coils required for a quadruple parallel star connection is already achieved. FIG. 12b illustrates a 4 pole phase including its phase band. FIG. 12c illustrates the 4 pole coil side vector star. FIG. 12d illustrates the 6 pole slot vector star. FIG. 12e is the 6 pole phase band plan and FIGS. 12f and 12g the corresponding m.m.f. polygons. The coil correlation given in FIG. 12b is constructed, with the aid of the 6 pole slot vector star of FIG. 12d, such that phase bands 180° spread are obtained. Each winding branch consists of only three half coils. The 6 pole winding factor $\xi_6$ is therefore relatively small. In the example it is equal to two-thirds. For larger numbers of slots it may be between two-thirds and $2/\pi$. Since in every layer the coil sides of two half coils are accommodated, the manufacturing cost of such a winding is comparable with that of reduced harmonic content windings.

A phase band arrangement such as that of FIG. 12a with a spread of 180° el for $p_1 = 3m$ can also be realized using conventional two layer and also possible single layer windings. The only prerequisite is that a sufficient number of winding coils induced in phase be available. A 12/18 pole two layer winding with undivided winding coils for N = 36 slots can be obtained in a manner similar to that with which the 6/4 pole winding of FIGS. 12b to 12g was obtained. This can be done, for example, by providing the correlation indicated in FIG. 12b by the respective symbol to the left for the coils accommodated in the first half of the circumference i.e., slots 1 to 18, and a corresponding correlation in accordance with the symbol at the right for those accommodated in the second half i.e., slots 19 to 36. In a winding designed in this manner, the phase band arrangement for $p_1 = 3m$ is repeated only after two or in other cases possibly more pole pairs leading to a poorer m.m.f. curve for $p_2 = 2n$ and to the appearance of subharmonics similar to those found in the case of windings having null non-wound branches.

In a winding according to the present invention, integer slot windings are required for the pole number $2p_2 = 4$ in accordance with Table I of FIG. 14. In a 4 pole design with half slot windings the number of coils must be doubled and the phase bands for $2p_1 = 6$ i.e., in accordance with FIG. 12a are given a spread of 180° instead of 90° as in the case of FIG. 2e for an integral slot winding. Another possibility with lower numbers of slots is to choose distributions similar to FIG. 2e but with $\zeta \neq 3 \Psi$. In such an arrangement, however, the individual winding branches cannot be balanced with regard to magnitude and phase of the induced voltages therein.

An example of such as 6/4 pole winding for N = 54 slots is shown by FIGS. 13a, 13b and 13c. In this example, the distribution of the upper layer coil sides is shown in FIG. 13a for one phase with $2p_2 = 4$ and in FIG. 13b the position of the 6 pole phase distribution axes. In FIG. 13c the coil side arrangements as well as the phases of the parallel branches for $2p_2 = 4$ in two variations as follows are shown: (a) with $\zeta = 100°$, $\Psi = 20°$ and (b) with $\zeta = 120°$, $\Psi = 0°$. double correlation with the null winding branch or with the basic-winding-branches belonging to the three different phases with $2p_2 = 6$ as characterized the footnote of FIG. 13a refers optionally to variation a or b. As the distributiion and phase diagrams of Table VII show, the balance of the basic-winding-branches, which are parallel for $2p_2 = 4$, is not pure so that equalizing currents must be tolerated. In principle, this is always the case with phase band arrangements similar to FIG. 2e with $\zeta \neq 3 \Psi$ or $90° < \zeta \leq 120°$ el. If present at all, the null winding branch must be made with coils having a reduced number of turns and correspondingly increased conductor cross section and must be connected in series.

Table VII of FIGS. 20a and 20b contains a compilation of the different embodiments and variation possibilities described with the aid of the examples of the windings according to the present invention and their specific properties.

In all embodiments only three of the six connecting points are connected to the power network at one time. Shorting of the other three connecting points, as required in known PAM and Dahlander circuits is unnecessary so that only a simple three pole switching device is required. A particularly advantageous possible application of the winding of the present invention is in pumped storage machines of high power rating where separate windings have heretofore been necessary due to the lack of pole changeable three phase windings (cf. BBC-Mitteilungen 7/74, pages 327 to 331). For the relatively small pole number differences required for this purpose, e.g., 16/12, 18/16, 20/18, 24/18 poles, the three phase winding of the present invention offers particularly great advantages. The coils, made with an unchorded pitch for the pole pair number divisible by three, have a chord which is pratically optimum for the other pole member. As a result minimal m.m.f. harmonic content results without the need for any special measures such as were discussed in connection with the 6/4 pole winding variations with reduced harmonic content. For use in pole changeable asynchronous machines, a considerably larger range of power ratings can be covered with the present invention than with know PAM windings. This is true first of all because of the more advantageous winding symmetry and the lower m.m.f. harmonic content resulting therefrom. Furthermore, adaptation of the magnetization is in considerably finer steps, according to the attainable steps of the effective number of turns because of the larger number of parallel connected winding branches and the possibility of interspersing.

The prresent invention is applicable, with the advantages noted above, for three phase windings in the stators and rotors of rotating machines as well in linear or sector travelling field machines.

Thus, an improved manner of obtaining a pole changeable three phase machine has been shown. Although specific embodiments have been illustrated and described, it will be obvious to those skilled in the art that various modifications may be made without departing from the spirit of the invention which is intended to be limited solely by the appended claims.

I claim:

1. A three phase winding for a slotted electric machine which can be changed for a pole pair ratio $p_1 : p_2 = 3m : 2n$, where $p_1 : p_2$ is a fractional number with aliquant integral numerator and denominator and $m$ and $n$ are integers, comprising:
   (a) a base winding which is formed by nine base winding branches each having the same number of series connected coils, each base winding branch having a beginning and an end;
   (b) groups of three base winding branches being connected together at their beginnings to form three phases, said connections forming the three connecting points for the pole pair number $p_1 = 3m$;
   (c) the ends of one base winding branch from each of the groups having their beginnings connected together, being connected together to form three phases and corresponding connecting points for the pole pair number $p_2 = 2n$;
   (d) the machine having slots which are arranged with uniform pitch;
   (e) said windings being disposed in said slots such that three coils sides which belong to the same phase for $p_2 = 2n$ and are equiphasal induced are arranged in three of the four slots which in the $p_2 = 2n$ pole pair slot-vector-star appear as vectors with the same direction and such that said three coil sides belong to different respective phase windings for the other pole pair number $p_1 = 3m$.

2. Apparatus according to claim 1 wherein, in each of the slot layers which are free of base windings, separate coil sides are arranged belonging to three further null winding branches, said null winding branch windings connected such that for the pole pair number $p_1 = 3m$ the voltages induced therein add up to zero.

3. Apparatus according to claim 2 wherein all windings, both said base winding branches and said further null winding branches are made up of identical coils having the same number of turns and equal conductor cross section.

4. Apparatus according to claim 2 wherein the coils of said null winding branches have a smaller number of turns and a larger conductor cross section than the coils of said base winding branches.

5. Apparatus according to claim 4 wherein the coils of said null winding branches differ from those of said base winding branches by a factor of 3 with respect to number of turns and conductor cross section.

6. Apparatus according to claim 3 wherein the beginnings of said null winding branches are connected with each other and the ends of said null winding branches to the respective ends of said base winding branches which are connected together and provide the connecting points for the pole pair number $p_2 = 2n$.

7. Apparatus according to claim 2 wherein the beginnings of the null winding branches are connected to the respective three ends of the base-winding-branches which are connected together to form said connecting points for $p_2 = 2n$, the ends of said null winding branches thereby forming the connecting points for the pole pair number $p_2 = 2n$.

8. Apparatus according to claim 1 wherein, in the $p_1 = 3m$ pole pair coil-side-star, the sectors occupied by said base winding branches forming a phase for $p_1 = 3m$ have a spread of 90 electrical degrees and the sectors in between containing the null-winding-branches a spread of 30 electrical degrees.

9. Apparatus according to claim 8 wherein said sectors occupied by said base winding branches and null branch sectors are interleaved.

10. Apparatus according to claim 9 wherein the $p_1 = 3m$ pole pair distribution of the coil side star is composed of $k = 1, 2 \ldots$ mutually displaced elementary distributions, each elementary distribution being formed by twelve elementary sectors with a spread of $30/k$ electrical degrees following each other at regular spacings of which three adjacent elementary sectors belong to the same respective base-winding-branch and the fourth elementary sector belongs to the null branch.

11. Apparatus according to claim 1 wherein the coil sides of the base and null branches which belong to a respective phase for a pole pair number of $p_2 = 2n$ are arranged in an interspersed manner which is the same from quarter to quarter of the circumference.

12. Apparatus according to claim 1 wherein all winding coils are designed at least approximately with an unchorded coil-pitch for the pole pair number divisible by 3.

13. Apparatus according to claim 1 wherein said winding coils are combined in concentric coil groups.

14. Apparatus according to claim 13 wherein a two layer winding with a uniform slot filling factor is used and wherein the number of turns within concentric coils groups are chosen to be different.

15. Apparatus according to claim 14 wherein said winding is single layer winding and wherein with respect to the arrangement in a two layer winding one-half of the concentric coils is left out and the other half is instead made with twice the number of turns.

16. Apparatus according to claim 1 wherein said windings comprise two partial windings, which are mutually staggered and whose winding branches are connected in series.

17. Apparatus according to claim 16 wherein the individual winding coils of the two partial windings are combined so that phase band overlapping two layer windings are obtained.

18. Apparatus according to claim 1 wherein, in the $p_1 = 3m$ pole pair coil side star, the base winding phase bands have a 180 electrical degree spread and the null branch phase bands in between a 60 electrical degree spread.

19. Apparatus according to claim 1 wherein only base windings are used whereby with a uniform slot shape the null branch phase band slots are empty or only partially occupied by coil sides of the base winding.

20. Apparatus according to claim 1 wherein only base windings are used and wherein the cross section of the slot shape which can be wound is adapted to its respective coil side occupancy.

21. Apparatus according to claim 20 wherein the tooth width between respective adjacent slots is made approximately uniform.

22. Apparatus according to claim 1 and further including a uniformly distributed secondary winding for one of the two pole pair numbers permanently connected with respective connecting points of the pole changeable winding.

* * * * *